United States Patent [19]
Matyas, Jr.

[11] Patent Number: 6,102,287
[45] Date of Patent: Aug. 15, 2000

[54] METHOD AND APPARATUS FOR PROVIDING PRODUCT SURVEY INFORMATION IN AN ELECTRONIC PAYMENT SYSTEM

[75] Inventor: Stephen M. Matyas, Jr., Manassas, Va.

[73] Assignee: International Business Machines Corporation, Armonk, N.Y.

[21] Appl. No.: 09/079,637

[22] Filed: May 15, 1998

[51] Int. Cl.[7] .................................................... G06K 5/00
[52] U.S. Cl. ............................................ 235/380; 705/14
[58] Field of Search ...................... 705/14, 26; 235/380, 235/375, 479, 382, 382.5

[56] References Cited

U.S. PATENT DOCUMENTS

| | | | |
|---|---|---|---|
| 5,546,316 | 8/1996 | Buckley et al. | 364/479.03 |
| 5,559,714 | 9/1996 | Banks et al. | 364/479.03 |
| 5,619,558 | 4/1997 | Jheeta | 379/90 |
| 5,734,890 | 3/1998 | Case et al. | 395/605 |
| 5,822,735 | 10/1998 | De Lapa et al. | 705/14 |
| 5,893,075 | 4/1999 | Plainfield et al. | 705/14 |
| 5,897,622 | 4/1999 | Blinn et al. | 705/26 |
| 5,940,807 | 8/1999 | Purcell | 705/26 |
| 5,950,172 | 9/1999 | Klingman | 379/92.01 |

OTHER PUBLICATIONS iKP—A Family of Secure Electronic Payment Protocols by M. Bellare et al—Aug. 2, 1995, USENIC Assoc, Aug. 2, 1995, pp. 89–106.

Mini–Pay: Charging per Click on the Web by A. Herzberg et al, 16 pgs. http://wwww6.nttlabs.com/HyperNews/get/PAPER99.html.

Netscape Navigator LiveConnect/Plug–In Software Development Kit, http://home.netscape.com/comprod/development_partners/plugin_api/index.html.

Applied Cryptography, Second Edition—Protocols, Algorithms and Source Code in C by B. Schneier—pp. 461–500.

*Primary Examiner*—Thien Le
*Attorney, Agent, or Firm*—William A. Kinnaman Jr.

[57] ABSTRACT

An electronic payment system in which a buyer purchases a product by sending an electronic payment order to a seller is enhanced to provide product survey information. An additional entity, an evaluator, collects product survey information from buyers that have previously purchased products from the seller and provides product survey information to prospective buyers upon request. Various schemes are disclosed for allowing the evaluator to verify that a buyer providing product survey information has actually purchased the product from the seller. In one verification scheme, the buyer generates an authentication code as a one-way function of a randomly generated secret value and includes the authentication code in the payment order. When the buyer later provides survey information to the evaluator, it includes the secret value along with the survey information. The evaluator verifies the purchase transaction by presenting the secret value along with information identifying the transaction to the buyer's billing system. The buyer's billing system retrieves the authentication code from the transaction information it received from the seller and compares it with the code regenerated from the secret value using the one-way function. The buyer's billing system communicates the comparison results to the evaluator, which uses the survey information if it is verified as relating to an actual transaction between the buyer and the seller. In another verification scheme, the evaluator presents only transaction-identifying information to the buyer's billing system. In yet another verification scheme, the seller signs the payment order and returns the signed payment order as a proof of purchase to the buyer, which presents the proof of purchase to the evaluator.

48 Claims, 10 Drawing Sheets

Extended MiniPay System

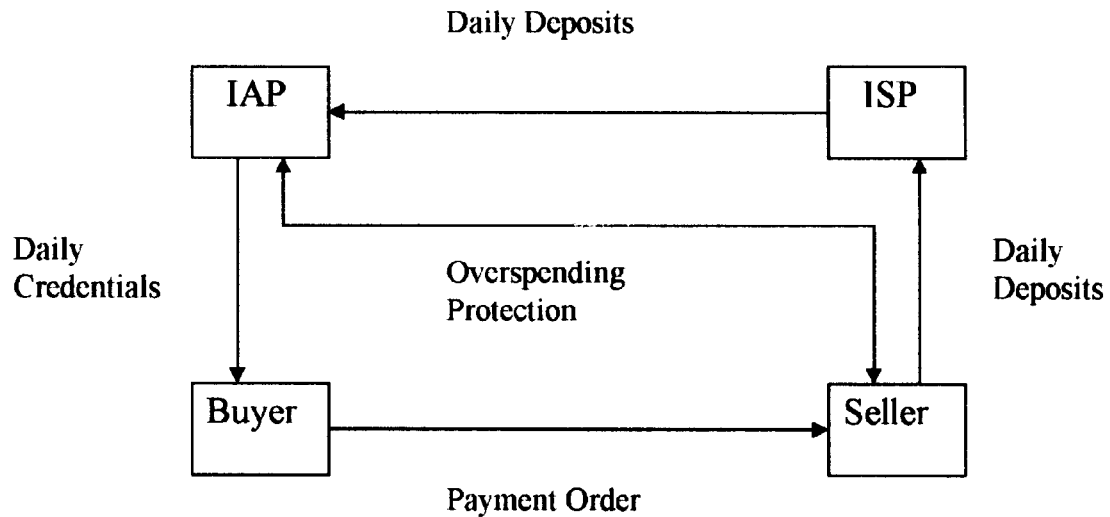
Fig. 1. MiniPay System
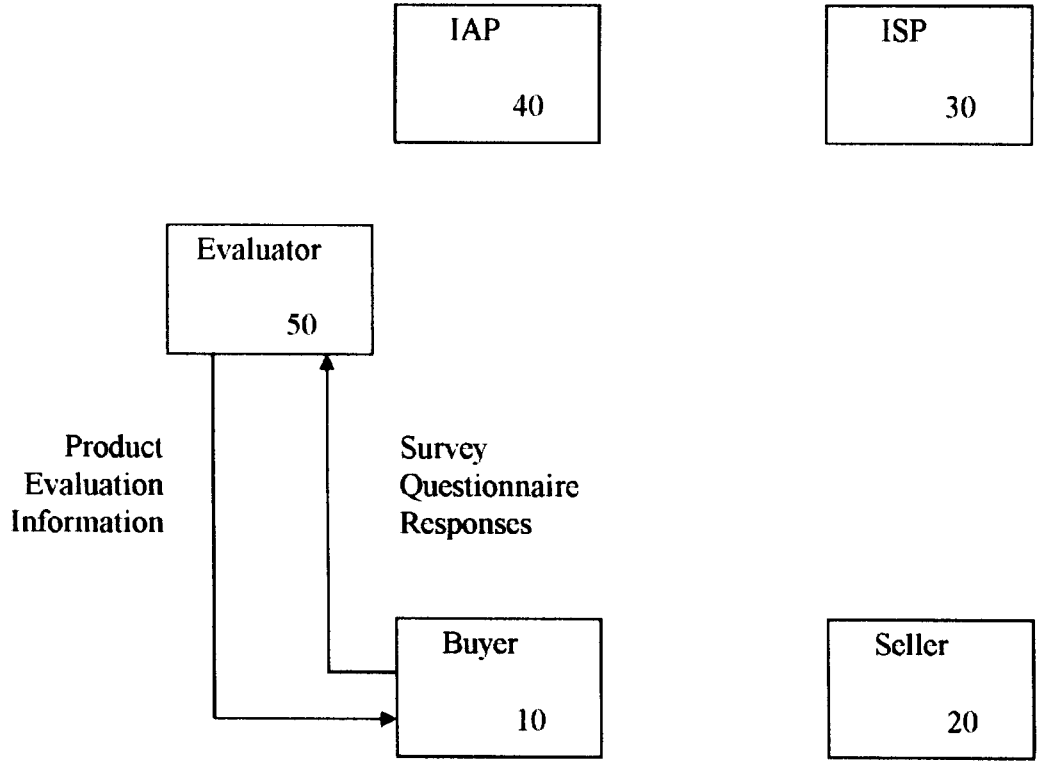
Fig 2. Extended MiniPay System

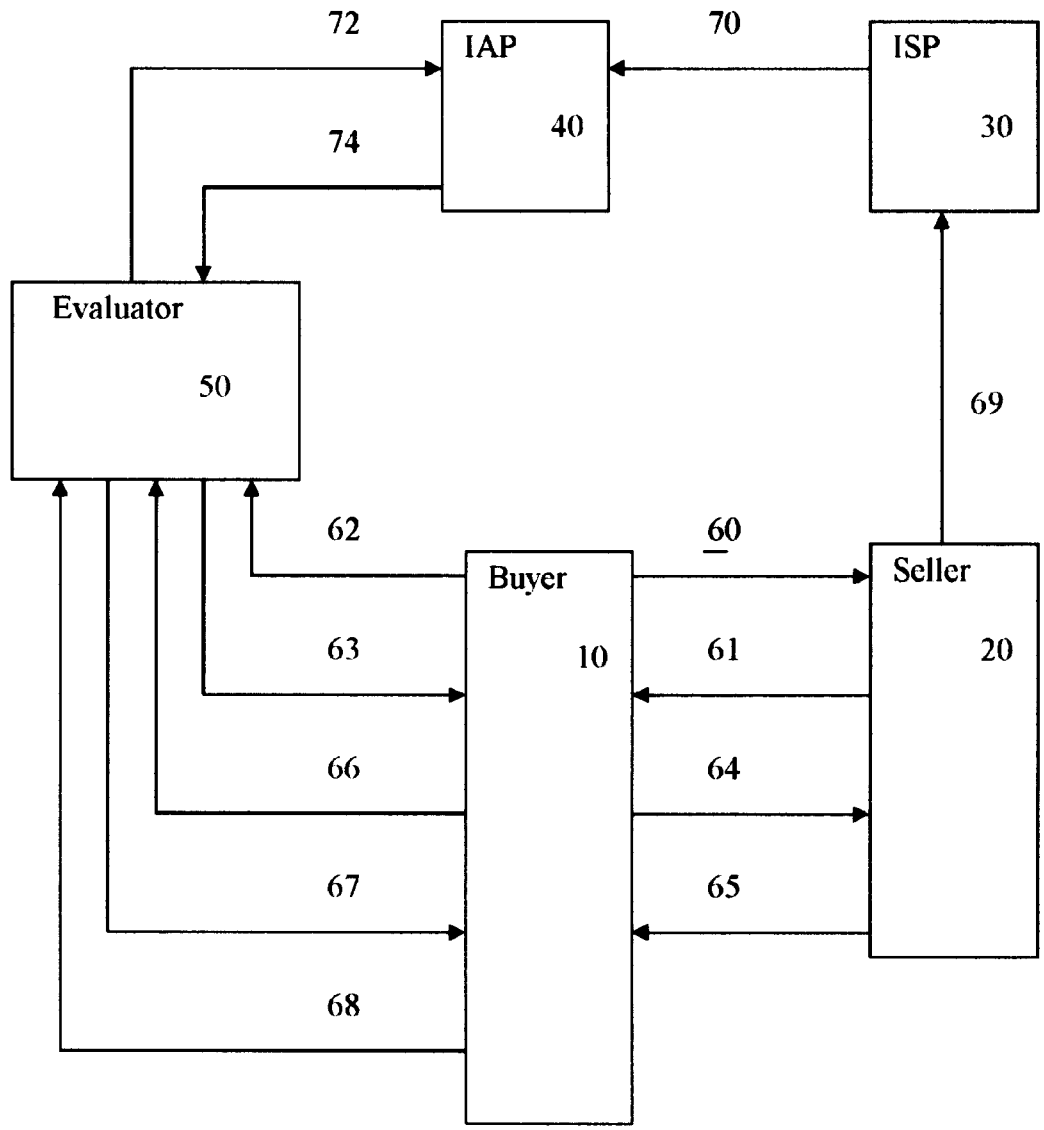
Fig. 3. Extended MiniPay System

Step 64
   Daily_Certificate 75
   MPay_Order = OldData, NewData,
      S_B(OldData, NewData) 76

Fig. 4. Modified MiniPay Purchase Protocol

Step 68
   PUB_E(Survey1, K1, K2, Rcode_B) 78,
   DataElements = {ID_IAP, acct_B, ID_Product, time} 80
   HMAC (K1, survey_questionnaire_responses) 82
   K2(survey_questionnaire_responses) 84

Fig. 5. Survey Protocol

Step 72
   ID_Evaluator 85,
   PUB_IAP(Survey2, K3, K4) 86,
   ListOfClaimedPurchases = {P1, P2, ..., Pn},
     where each P = {acct_B, ID_Product, time, K3(Rcode_B)} 88
   HMAC(K4, ListOfClaimedPurchases) 90

Step 74
   ID_IAP 91
   ResponseList = {R1, R2, ..., Rn},
     where each R = {P, OK/fail_code } 92
   S_IAP(Survey3, ResponseList) 94

Fig. 6. Survey Reconciliation Protocol

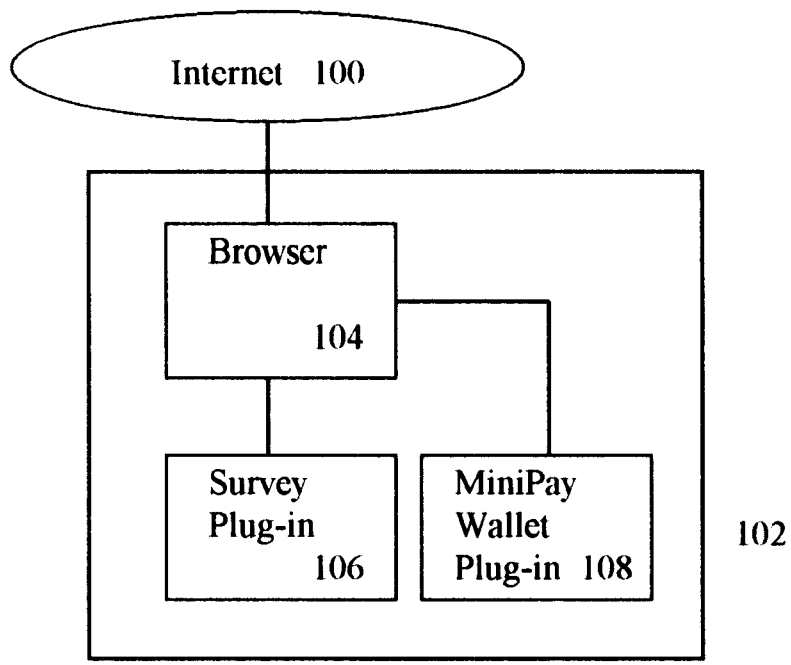
Fig. 7. Buyer's Client System
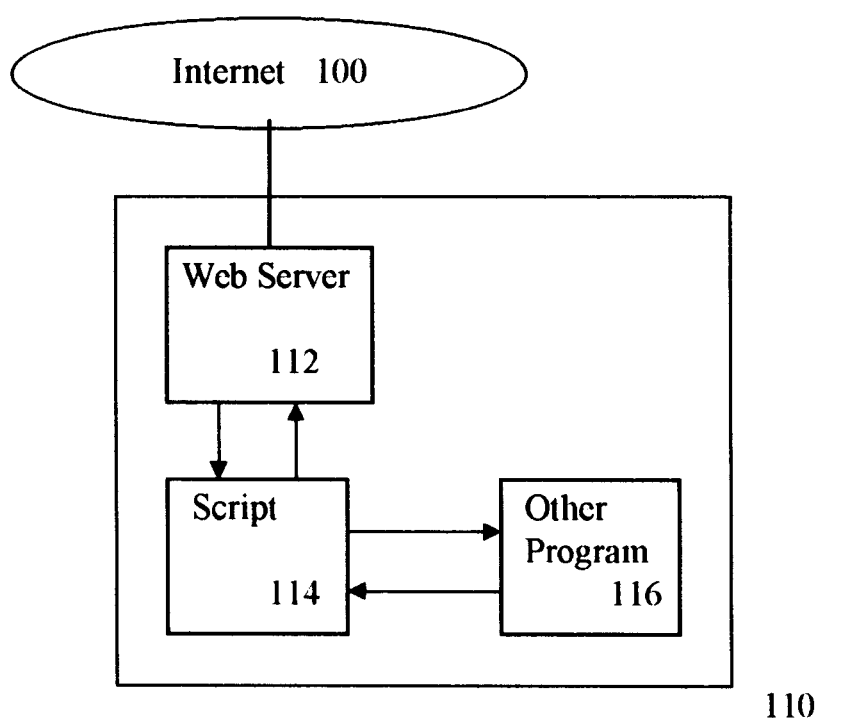
Fig. 8. Seller's and Evaluator's Server System

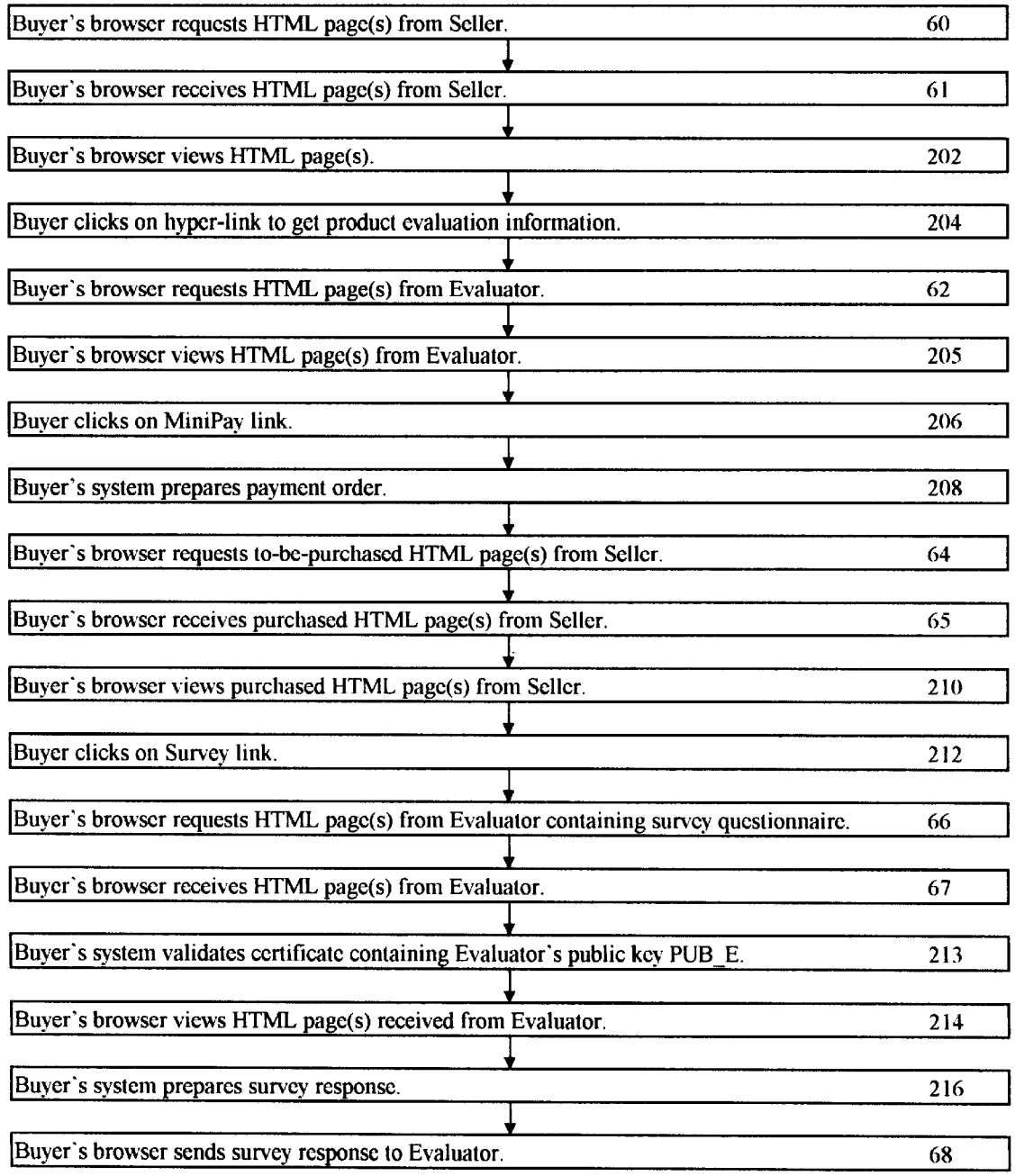
Fig. 9. Steps by Buyer

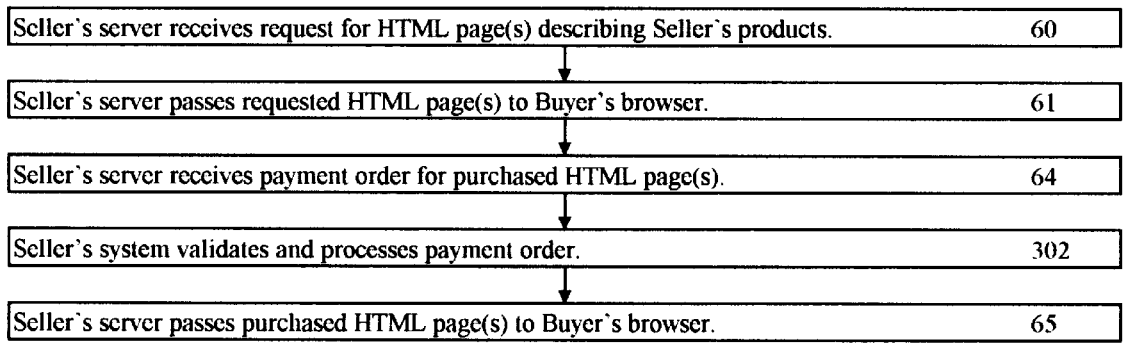
Fig. 10. Steps by Seller
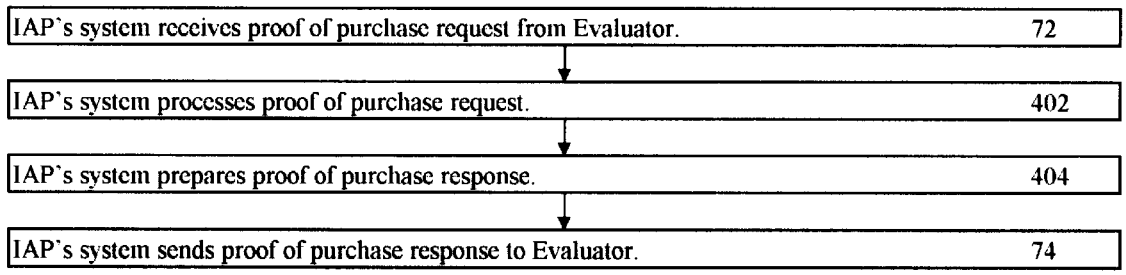
Fig. 11. Steps by IAP

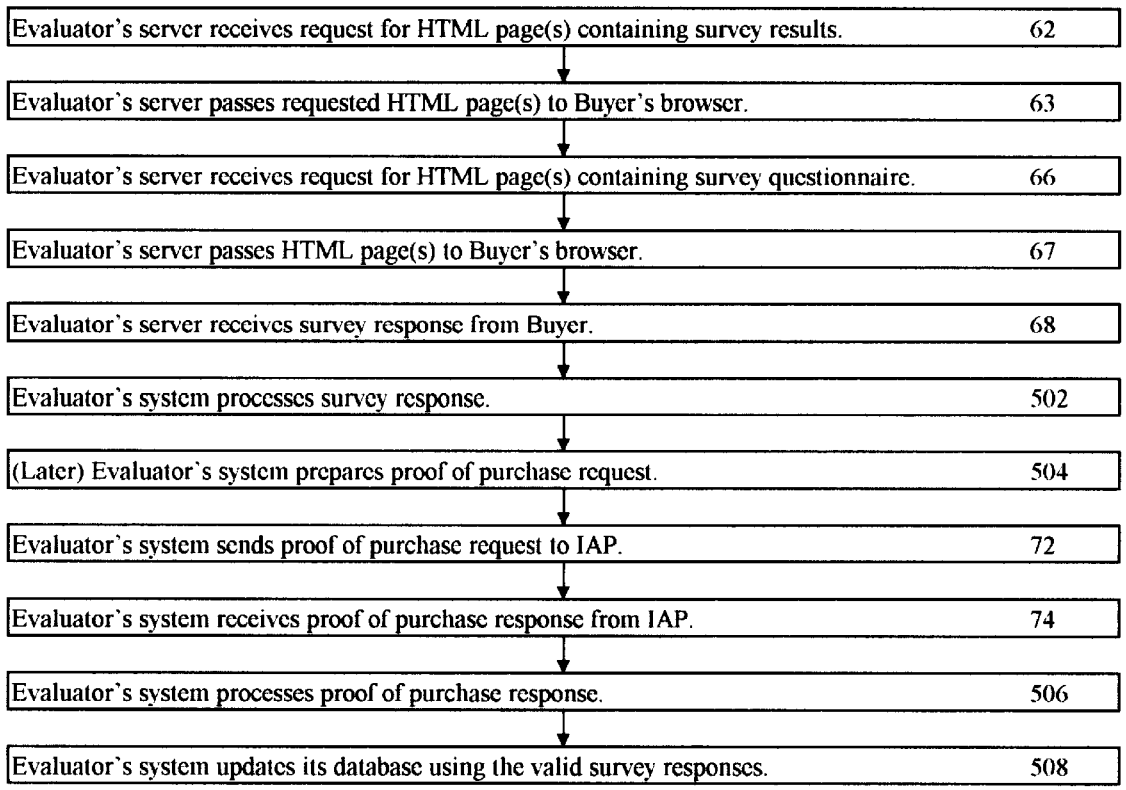
Fig. 12. Steps by Evaluator
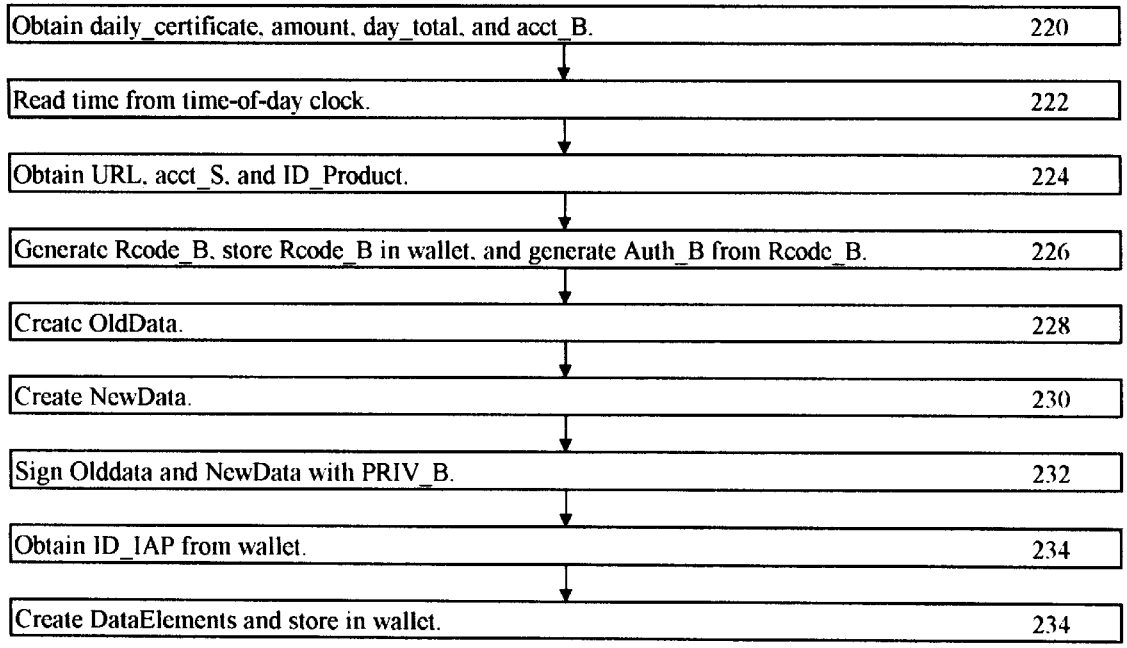
Fig. 13. Buyer's Step 208 in Fig. 9

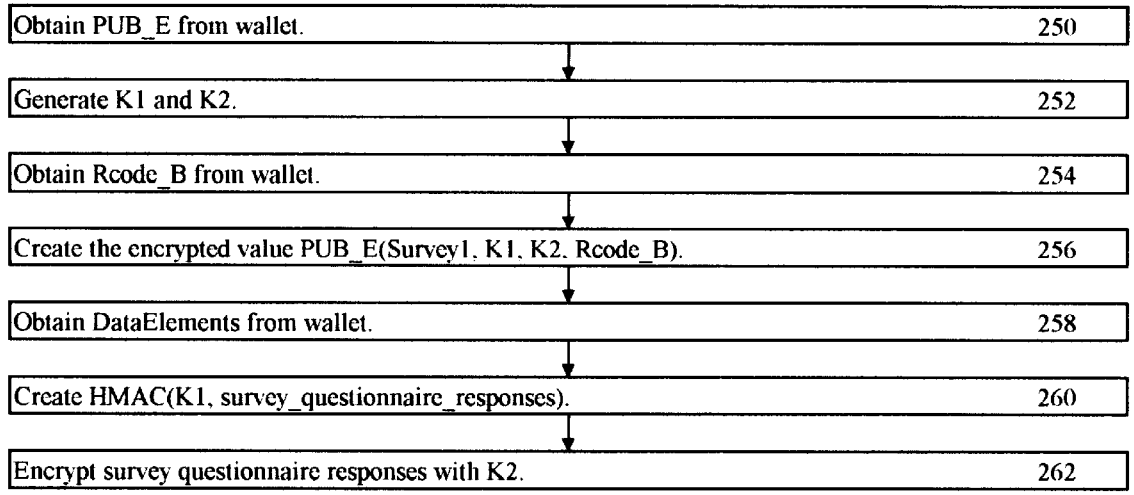
Fig. 14. Buyer's Step 216 in Fig. 9.
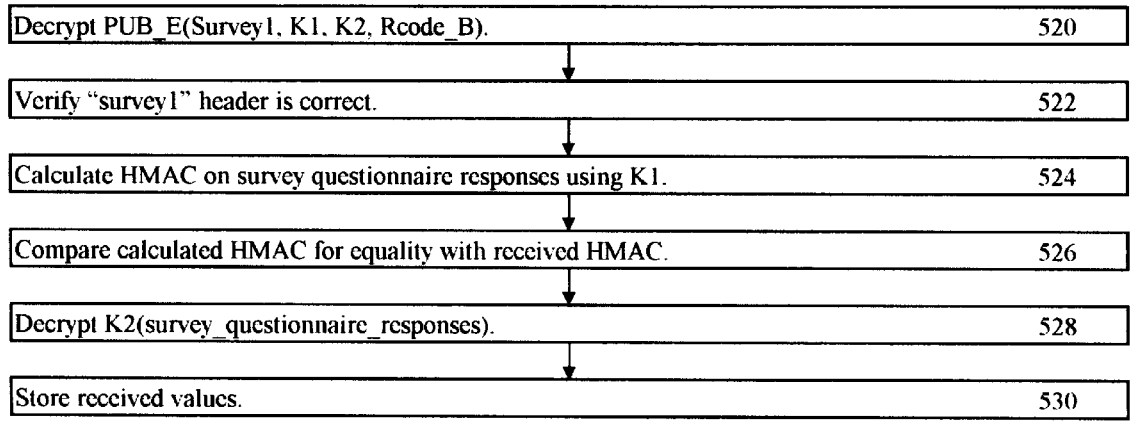
Fig. 15. Evaluator's Step 502 in Fig. 12

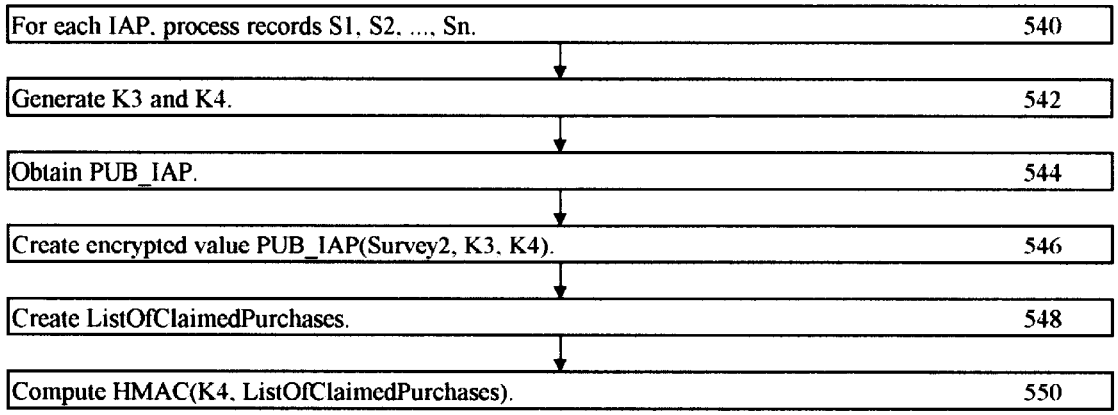
Fig. 16. Evaluator's Step 504 in Fig. 12
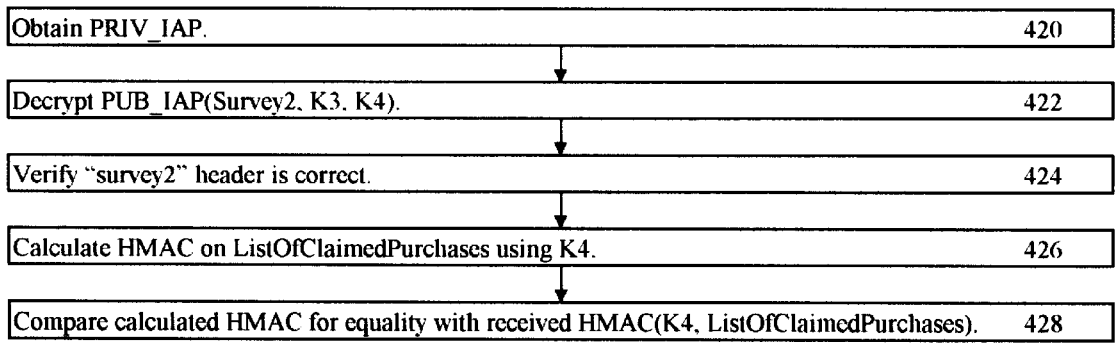
Fig. 17. IAP's step 402 of Fig. 11

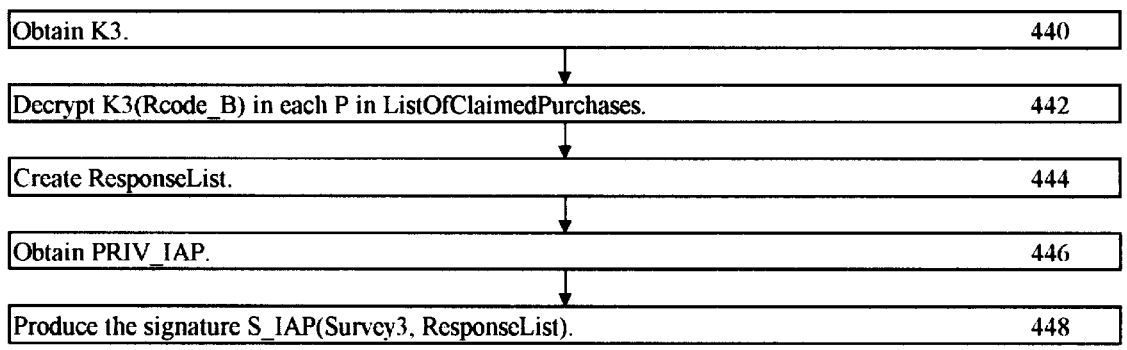
Fig. 18. IAP's step 404 in Fig. 11
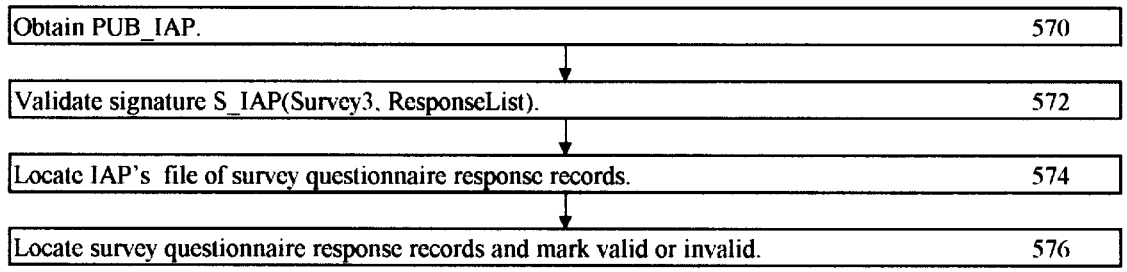
Fig. 19. Evaluator's step 506 in Fig. 12

METHOD AND APPARATUS FOR PROVIDING PRODUCT SURVEY INFORMATION IN AN ELECTRONIC PAYMENT SYSTEM

BACKGROUND OF THE INVENTION

1. Field of the Invention

This invention relates to communication systems and, more particularly, to communications occurring on the Internet or World Wide Web. The invention finds particular use in applications and services involving shopping and purchase of goods and services requiring payments of money.

2. Description of the Related Art

Many applications and services on the Internet, such as on-line shopping at an Internet shopping mall, depend on the purchaser's ability to pay for merchandise and services. Moreover, the appeal of electronic commerce without electronic payment is limited.

iKP (denoting 1KP, 2KP, and 3KP) is a family of secure electronic payment protocols for implementing credit card-based transactions between a customer and a merchant, while using the existing financial network for clearing and authorization (see M. Bellare et al., "iKP—A Family of Secure Electronic Payment Protocols," Proceedings of the First USENIX Workshop on Electronic Commerce, New York, N.Y., Jul. 11–12, 1995, pages 89–106, incorporated herein by reference). The iKP protocols are based on public key cryptography and are the forerunner to the Secure Electronic Transaction (SET) protocol (to be described next), a well-known protocol in widespread use today.

The Secure Electronic Transaction (SET) protocol was developed jointly by MasterCard and VISA and is described at http://www.mastercard.com/set/, incorporated herein by reference. SET was specifically designed to support payments based on the existing credit card infrastructure. SET uses a system of locks and keys along with certified account IDs for both consumers and merchants. Through a unique process of encrypting or scrambling, the information exchanged between the shopper and the on-line store, SET ensures a payment process that is convenient, private, and secure. Specifically, SET keeps payment information confidential, it increases integrity for all transmitted data through encryption, it provides authentication that a cardholder is a legitimate user of a branded payment card account, and it provides authentication that a merchant can accept branded payment card transactions through its relationship with an acquiring institution. Because the SET protocol is designed to support payments based on the existing credit card infrastructure and mechanisms, SET payments involve a substantial per-transaction fee (typically 20 cents minimum) and therefore are inappropriate for payments of small amounts.

Herzberg and Yochai describe a payment mechanism for small amounts, or "micro payments", which they call MiniPay, see Amir Herzberg and Hilik Yochai, "Mini-Pay: Charging per Click on the Web," Sixth WWW Conference, Santa Clara, April, 1997. The conference paper is also available on the Internet at http://www6.nttlabs.com/HyperNews/get/PAPER99.html, incorporated herein by reference. MiniPay is suitable for applications and services requiring the payment of small amounts, such as for information, games, and loadable software. The single item purchased via MiniPay could be a license to access a complete site for a predefined period of time. Consequently, once the buyer has acquired access to a site, he or she might then have free access to several additional HTML links available through that site. The parameters contained in the offer sent in an HTML page from the seller to the buyer would spell out the details of the offer. The MiniPay protocol is designed specifically to provide a means for payments of information or services purchased and delivered to a buyer over the Internet.

In a MiniPay protocol, a user of the Internet makes a small payment for a product or service, e.g., to receive an electronic stored copy of a a document such as a newspaper. A mini-payment is a small payment, e.g., a payment that does not exceed $25. In the case of a web document, before paying and seeing the actual document, the user may see—at no charge—an abstract, overview, or sales promotion that describes it. Before "seeing" the actual document, the user must issue a payment, which is accomplished by "signing", or preparing an electronic digital signature with the user's private key. Each user has a public/private key pair that can be used for authorizing mini-payments. In effect, the digital signature authorizes the payment. Once the signature has been prepared and verified, the user is then allowed to "see" the requested information. The MiniPay protocol is embedded in a "point and click" model that is designed to make access to electronically stored information as easy and painless as possible. Thus, when a user "clicks"—requesting to "see" the information—the MiniPay protocol is invoked transparently so that the cryptographic processing details are hidden from the user.

A disadvantage of the MiniPay protocol is that the user must commit—by making a payment—before "seeing" the actual web document. Therefore, it would be desirable if the user had a option for finding out more about a requested web document before "clicking" to pay and "see" the document.

SUMMARY OF THE INVENTION

One object of the present invention is to provide an electronic payment system that allows buyers to received product survey results.

Another object of the present invention is to provide a means within an electronic payment system to conveniently display product survey results by using a client browser.

Another object of the present invention is to provide an electronic payment system that allows buyers to take surveys for products they have purchased.

Another object of the present invention is to provide a means within an electronic payment system to conveniently input survey results using a client browser.

Another object of the present invention is to provide a convenient means to protect the integrity of product survey responses sent from a buyer to the evaluator.

Another object of the present invention is to provide a convenient means for the evaluator to detect false product survey responses sent to the evaluator by hackers who pretend to be valid buyers.

Another object of the present invention is to provide a convenient means for the evaluator to verify that a buyer who claims to have purchased a product did in fact purchase the product.

Another object of the present invention is to provide a convenient means for the buyer to receive a proof-of-purchase from the seller.

The present invention relates to a method and apparatus for providing product survey information in an electronic payment system, such as the MiniPay system, so that buyers can receive product evaluation information prior to making purchases and so that buyers can participate in on-line surveys, in order that they may provide comments about purchased products. In accordance with the present invention, an electronic payment system in which a buyer purchases a product by sending an electronic payment order to a seller is enhanced to provide product survey information. An additional entity, an evaluator, collects product survey information from buyers that have previously purchased products from the seller and provides product survey information to prospective buyers upon request.

Survey responses sent from the buyer to the evaluator and survey results sent from the evaluator to the buyer are exposed to possible interception and modification. The present invention is concerned with, among other things, the issue of the integrity of survey responses sent from a buyer to the evaluator.

Survey responses sent from a buyer to the evaluator are exposed to possible modification, e.g., by an adversary who performs an active line attack. But a more serious threat comes from a hacker who poses as a buyer and sends false survey responses to the evaluator. This could easily cause survey results to become biased or incorrect, and therefore untrustworthy. And ultimately, confidence in the evaluator could be undermined or lost.

The present invention contemplates various schemes for enabling an evaluator to verify that a buyer providing product survey information has actually purchased the product from the seller. In one verification scheme, the buyer generates an authentication code as a one-way function of a randomly generated secret value and includes the authentication code in the payment order. When the buyer later provides survey information to the evaluator, it includes the secret value along with the survey information. The evaluator verifies the purchase transaction by presenting the secret value along with information identifying the transaction to the buyer's billing system. The buyer's billing system retrieves the authentication code from the transaction information it received from the seller and compares it with the code regenerated from the secret value using the one-way function. The buyer's billing system communicates the comparison results to the evaluator, which uses the survey information if it is verified as relating to an actual transaction between the buyer and the seller.

In another verification scheme, the evaluator presents only transaction-identifying information to the buyer's billing system. In yet another verification scheme, the seller signs the payment order and returns the signed payment order as a proof of purchase to the buyer, which presents the proof of purchase to the evaluator.

The present invention provides a method for protecting the integrity of survey responses and for ensuring that survey responses come from buyers who actually purchased the products in question. As a result, buyers will be able to receive product evaluation information and fill-in product survey questionnaires in real time, thus providing additional information to buyers and thereby enabling buyers to make better and more informed decisions about product purchases.

The present invention makes use of symmetric key and asymmetric key cryptography for data privacy and authentication, as described below.

A software implementation is described below. However, in general the present invention may be implemented in hardware, software or a combination of hardware and software.

BRIEF DESCRIPTION OF THE DRAWINGS

FIG. 1 is a block diagram illustration of the MiniPay system.

FIG. 2 is a block diagram illustration of the extended MiniPay system.

FIG. 3 is a block diagram illustration of the extended MiniPay system.

FIG. 4 is a block diagram illustration of a modified MiniPay purchase protocol.

FIG. 5 is a block diagram illustration of a survey protocol.

FIG. 6 is a block diagram illustration of a survey reconciliation protocol.

FIG. 7 is a block diagram illustration of a buyer's client system.

FIG. 8 is a block diagram illustration of a seller's and evaluator's server system.

FIG. 9 is a flowchart of the processing steps performed by the buyer.

FIG. 10 is flowchart of the processing steps performed by the seller.

FIG. 11 is a flowchart of the processing steps performed by the buyer's billing system.

FIG. 12 is a flowchart of the processing steps performed by the evaluator.

FIG. 13 is a flowchart of the processing steps associated with step 208 of FIG. 9.

FIG. 14 is a flowchart of the processing steps associated with step 216 of FIG. 9.

FIG. 15 is a flowchart of the processing steps associated with step 502 of FIG. 12.

FIG. 16 is a flowchart of the processing steps associated with step 504 of FIG. 12.

FIG. 17 is a flowchart of the processing steps associated with step 402 of FIG. 11.

FIG. 18 is a flowchart of the processing steps associated with step 404 of FIG. 11.

FIG. 19 is a flowchart of the processing steps associated with step 506 of FIG. 12.

DESCRIPTION OF THE PREFERRED EMBODIMENTS

As a preliminary to discussing the electronic payment system of the present invention, a conventional MiniPay system will first be described. Referring to FIG. 1, a typical MiniPay system consists of five parties, as follows:

1. A buyer 10: The MiniPay software running on the buyers' machine as the MiniPay wallet.
2. A seller (or merchant) 20: The on-line content or service provider.
3. The buyer's billing system 40, typically an Internet access provider (IAP), a phone company (Telco, PTT), a financial processor.
4. The seller's billing system 30, typically a bank or an Internet service provider (ISP).
5. An exchange (not shown) connecting the buyer's billing system 40 (the IAP) to the seller's billing system 30 (the ISP or bank). This would typically be a financial institution.

The basic protocol flows of MiniPay can be described in terms of the four-party case, without the Exchange, as follows:

1. The buyer 10 sends to the seller 20 a signed MiniPay payment order, piggybacked on the usual GetURL message sent normally from browser to server. The payment order also includes a daily certificate, which is provided daily from the IAP 40 to the buyer 10. The seller 20 verifies the signature of the IAP 40 on the certificate, thereby confirming that the buyer 10 is still in good standing with the IAP 40, and learning the public key of the customer (buyer 10). The seller 20 then verifies the signature on the MiniPay payment order using the public key of the customer (buyer 10). If the signature verifies okay, the seller 20 accepts the signed MiniPay payment order and completes the transaction. Otherwise, the MiniPay payment order is not accepted, and the transaction is denied.

2. The certificate also includes an off-line limit, which denotes the maximal amount of purchases per day that the buyer 10 can do, before an on-line confirmation from the IAP 40 is required. If the seller 20 finds that the total spending by the buyer 10 on that day, in this seller 20, exceeds its off-line limit, then the seller 20 will contact the IAP 40, by sending an extra-spending request message to the IAP 40. The IAP 40 would update the known spending by the buyer 10 with the amount in the extra-spending request, and would send back an electronically signed extra-spending reply with either approval of some additional amount to spend before asking again, or by refusing. The signing is accomplished using public key cryptography.

3. At fixed periods, or when the number of payments orders received is too large, the seller 20 would aggregate all the payment orders received from all buyers, and would send them as a single, signed deposit message to the ISP 30, which represents the beginning of the clearing process.

4. The ISP 30, in turn, would periodically aggregate payment orders from all of its sellers, and route them to the corresponding IAPs, in signed deposit messages.

5. At the end of each day, or at the first purchase of the following day, the buyer's wallet would contact its IAP 40, for their daily process. In this process, the IAP 40 would confirm agreement on the purchases for one day earlier with the wallet, in particular, informing the wallet if there were purchases that the seller 20 failed to deposit, e.g., due to a power failure, so that the balance of the buyer 10 in his wallet matches the balance at the IAP 40. The IAP 40 and the wallet also sign the balance and sum of purchases to each other, which may allow them to erase some of the records. The signature of the IAP 40 also serves as the daily certificate that the buyer wallet appends to each payment order.

Operations 1–5 above are done automatically by the MiniPay modules at each of the parties, namely the wallet of the buyer 10 and the modules of the seller 20, the IAP 40, and the ISP 30 (see FIG. 1).

The MiniPay protocols use cryptography and, more particularly, public key cryptography. Cryptographic systems are well known in the data processing art. In general, such systems operate by performing an encryption operation on a plaintext input block, using an encryption key, to produce a ciphertext output block. The receiver of an encrypted message performs a corresponding decryption operation, using a decryption key, to recover the plaintext block.

Encryption systems fall into two general categories. Symmetric (or private key) encryption systems such as the Data Encryption Standard (DES) system use the same secret key for both encrypting and decrypting messages. In the DES system, a key having 56 independently specifiable bits is used to convert 64-bit plaintext blocks to ciphertext blocks, or vice versa.

Asymmetric (or public key) encryption systems, on the other hand, use different keys that are not feasibly derivable from one another for encryption and decryption. A person wishing to receive messages generates a pair of corresponding encryption and decryption keys. The encryption key is made public, while the corresponding decryption key is kept secret. Anyone wishing to communicate privately with the receiver may encrypt a message using the receiver's public key.

Only the receiver may decrypt the message, however, since only he has the private key. Perhaps the best-known asymmetric encryption system is the RSA encryption system, named after its originators Rivest, Shamir and Adleman.

Asymmetric cryptographic algorithms are also widely used to certify the origin of or ensure the security or integrity of messages in data communications systems. Various types of such algorithms exist of which one well known variant is the RSA algorithm. A general introduction to public key cryptography and the RSA algorithm can be found in: Schneier, 'Applied Cryptography,' 2nd Edition, pages 461–500, Wiley 1996. These algorithms have some distinct advantages over the more traditional symmetric key algorithms. In particular, they provide the ability for a key to be published or certified so that any independent third party can receive and verify a message without reference to a central authority.

One example of the use of public key cryptography in data communications is in the generation of digital signatures. The principle behind these techniques is the creation of a public digital value—the signature—which depends on a message to be transmitted and the signing user, so the receiving user can be sure that the sending user, and no other user, could create the signature value, and that the user created the signature value for this message and no other.

In such systems, the party signing a message has a private key for which there exists a corresponding public key. The public key is available so that anyone can use it to decrypt data that the signer encrypts using the private key, but no one can create such encrypted data without access to the private key.

Typically, the signer produces a hash value from the message using a strong hash algorithm, such that the chance of another message resulting in the same value is extremely low. The means of calculating this value is public knowledge but there is no feasible way to determine a different message that results in the same value. The signer encrypts the value using the private key, and sends the message and the encrypted value to the recipient.

The recipient can use the public key to decrypt the value, and can test whether the calculation on the message produces the same value. If it does, this satisfies the recipient that the message was the one signed because there is no feasible way to calculate another message that produces the same value. The recipient can also be sure that the signer did indeed sign the message because no one can create the encrypted value without access to the private key.

In some situations, it may be advantageous to use public key cryptography for privacy as well as for signing messages. In such cases, it is advisable and common practice to use different keys for these two different purposes. Thus, one pair of keys (public and private) is used to encrypt messages for privacy and another pair of keys (public and private) is used for signing messages.

The public and private keys used by the buyer 10 and IAP 40 in MiniPay protocol are as follows:

1. The buyer 10 (denoted B) has a public and private key pair (denoted PUB_B and PRIV_B). The buyer 10 uses PRIV_B for signing payment orders sent to the seller(s) and the seller 20 uses PUB_B for verifying the buyer-signed payment orders received from the buyer 10. Also, the buyer 10 uses his private key (PRIV_B) to sign the daily messages sent to his IAP 40, which contain the balance in his wallet and the sum of purchases for the prior day. In turn, the IAP 40 uses the buyer's public key (PUB_B) to verify the signed daily messages received from the buyer 10.

2. The IAP 40 has a public and private key pair (denoted PUB_IAP and PRIV_IAP). The IAP 40 uses PRIV_IAP for signing certificates that it issues and the seller 20 uses PUB_IAP for verifying the signed certificates issued by the IAP 40. An IAP-signed certificate contains the public key of a buyer 10 (PUB_B), the account number of the buyer 10 (acct_B), and other information. acct_B represents the identity of buyer B. The so-signed certificate binds the public key of the buyer 10 (PUB_B) to his account number (acct_B). Also, the IAP 40 uses PRIV_IAP for signing extra-spending reply messages sent from the IAP 40 to a seller 20. In turn, the seller 20 uses PUB_IAP for verifying the signed extra-spending reply messages received from the IAP 40.

3. The seller 20 has a public and private key pair (denoted PUB_S and PRIV_S). The seller 20 uses PRIV_S for signing deposit messages sent to his ISP 30. The ISP 30 uses PUB_S for verifying the signed deposit messages received from the seller 20. A deposit message consists of several payment orders that have been aggregated together.

4. The ISP 30 has a public and private key pair (denoted PUB_ISP and PRIV_ISP). The ISP 30 uses PRIV_ISP for signing deposit messages sent to the various IAPs. Each IAP 40 uses PUB_ISP for verifying the signed deposit messages received from the ISP 30.

Prior to running the MiniPay protocol, it is necessary that the buyer 10 knows the public key and identity of its billing system (the IAP 40) and the seller 20 knows the public key and identities of the IAP 40 and its billing system (the ISP 30). The MiniPay protocol is designed so that it is unnecessary to query for unknown keys on-line, as this would be inefficient. This is accomplished through the use of a periodical public key distribution protocol run between every two peer billing servers, and from the IAP 40 to the seller 20.

On the other hand, the public keys of buyers and IAPs are exchanged using a registration and routing protocol (shown below). In like manner, the public keys of the seller 20 and ISP 30 are exchanged using a similar registration and routing protocol (not shown).

The following notation is used in the described MiniPay protocols:

1. Signatures: S_x(msg) denotes a signature over message msg by party x. We do not assume a signature algorithm with the property of message recovery, e.g., the RSA algorithm. Hence, in the MiniPay protocols, any part of msg that is not known to the receiver, or that cannot be computed by the receiver, is sent in the clear, in order to ensure that the receiver will have all information necessary to validate the signature.

2. Hash: H(msg) denotes a one-way hash of message msg, which is easily computed by anyone from msg, but tells nothing about msg. Also it is hard to find a different message (different_msg) such that H(msg)=H(different_msg).

The MiniPay protocols can be described as follows:

The registration and routing protocol is used by a buyer 10 to setup an account with an IAP 40 and to certify the public key associated with this account. The registration and routing protocol is used to distribute the public key of the buyer 10 (PUB_B) to the IAP 40 and to distribute the public key of the IAP 40 (PUB_IAP) to the buyer 10. The registration and routing protocol is described as follows:

Initially, the buyer 10 receives acct_B and secret code_B from IAP 40 and generates PUB B, PRIV_B, where:

1. acct_B is B's account identifier assigned by the IAP 40.
2. code_B is a secret value assigned by the IAP 40, and is used by B to prove his identity to the IAP 40.

B then sends IAP 40: Reg_req, salt 1, acct_B, PUB_B, time, and S_B(Reg_req, H(code_B, salt 1, PUB_B, acct_B, time)), where:

1. Reg_req is a field indicating that the message is a registration request message.
2. salt1 contains a random or pseudorandom value (randomizer) generated by the buyer 10 and is used to protect code_B from guessing (dictionary) attacks. PUB_B is B's public verification key.
3. acct_B is B's account identifier.
4. PUB_B is B's public verification key.
5. time denotes the date and time of the registration request message.

The self-signed message S_B(Reg_req, . . . ) registers PUB_B for user acct_B using the secret code code_B received previously from the TAP 40.

The IAP 40 uses the received value of acct_B to recover code_B. The TAP 40 uses the recovered value of code_B and the received values of salt1, PUB_B, acct_B, and time to compute the hash value H(code_B, salt1, PUB_B, acct_B, time). The TAP 40 then uses B's public verification key PUB_B, together with the values Reg_req and H(code B, salt1 PUB_B, acct_B, time), to validate the signature S_B(Reg_req, H(code_B, salt1, PUB_B, acct_B, time)). The process of validating the signature depends on the particular signature algorithm, and is unimportant with respect to the operation and functioning of the protocol itself. If the time field contains correct information, and the signature is determined to be valid, then the registration request message and public key (PUB_B) are accepted; otherwise the registration request message is rejected.

IAP 40 then sends B: Reg_res, OK/fail_code, salt2, acct_B, PUB_B, time, fees, PUB_IAP, and S_IAP(Reg_res, OK/fail_code, acct_B, PUB_B, time, fees, H(code_B, salt2, PUB_IAP))where:

1. Reg_res is a field indicating that the message is a registration response message.
2. OK/fail_code is a field indicating that the registration response has been accepted (OK) or not accepted (Not OK). If the registration response is not accepted, then the OK/fail_code field contains a failure code explaining the cause of the failure.
3. salt2 contains a random or pseudorandom value (randomizer) generated by the IAP 40 and is used to protect code_B from guessing (dictionary) attacks.
4. acct_B is B's account identifier.
5. PUB_B is B's public verification key.
6. time denotes the date and time of the registration response message.
7. fees specifies the fees imposed by the IAP 40, which the buyer's wallet would need to add to the cost sent from the seller 20.

8. PUB_IAP is the IAP's public verification key.

The buyer 10 uses the previously saved value of code_B, and the received values of salt2 and PUB_IAP to compute the hash value H(code_B, salt2, PUB_IAP). The buyer 10 then uses the IAP's public verification key PUB_IAP, together with the values Reg_res, OK/fail_code, salt2, acct_B, PUB_B, time, fees, and H(code_B, salt2, PUB_IAP), to validate the signature S_IAP(Reg_res, OK/fail_code, acct_B, PUB_B, time, fees, H(code_B, salt2, PUB_IAP)). The process of validating the signature depends on the particular signature algorithm, and is unimportant with respect to the operation and functioning of the protocol itself. If the OK/fail_code field indicates "OK" and the time field contains correct information, and the signature is determined to be valid, then the registration response message and public key (PUB_IAP) are accepted; otherwise the registration response message is rejected.

The daily buyer protocol is run once at the beginning of each day. It provides the buyers' wallet with a daily certificate from the IAP 40 and it exchanges the total balance of the previous day, thus permitting the logs of transactions kept by the buyer 10 and IAP 40 to be updated and synchronized. The daily buyer protocol is described as follows:

B first sends IAP 40: Daily_req, balance, acct_B, time, and S_B(Daily_req, balance, acct_B, time). This protocol is run once at the beginning of each day, and the purpose it serves is a means for the IAP 40 to provide the buyer's wallet with a daily certificate from the IAP 40. The MiniPay protocol requires the buyer 10 to have a fresh certificate daily. The daily buyer protocol could also be used by the buyer 10 to change his public and private key pair and to receive a certificate for the new public key PUB_B. In that case, the information sent to the IAP 40 would include the new PUB_B together with a flag, e.g., in the Daily req header to indicate that a new PUB_B is being forwarded to the IAP 40, and the information signed by B would include the new PUB_B. The old private key PRIV_B would be used to sign the protocol data in either case.

1. Daily_req is a field indicating that the message is a daily request message.
2. balance contains the balance in the buyer's wallet at the end of the previous day.
3. acct_B is B's account identifier.
4. Time denotes the date and time of the daily request message.

The IAP 40 uses the received value of acct_B to identify the buyer 10 and to locate the buyer's public key PUB_B. The IAP 40 then uses the buyer's public verification key PUB_B, together with the received values Daily_req, balance, acct_B, and time, to validate the signature S_B (Daily_req, balance, acct_B, time). The process of validating the signature depends on the particular signature algorithm, and is unimportant with respect to the operation and functioning of the protocol itself. If the time field contains correct information, and the signature is determined to be valid, then the daily request message is accepted and the IAP 40 issues a new certificate; otherwise the daily request message is rejected.

The IAP 40 then sends B: Daily_Certificate={Daily_res, OK/fail_code, acct_B, PUB_B, time, reco_offline_limit, total_lim, salt3, real_bal, and S_IAP(Daily_res, OK/fail_code, acct_B, PUB_B, time, reco_offline_lim, H(total_lim, salt3, real_bal))}.

1. The Daily res field indicates that the message is a daily response message.
2. OK/fail_code is a field indicating that the daily response message has been accepted (OK) or not accepted (Not OK). If the daily response message is not accepted, then the OK/fail_code field contains a failure code explaining the cause of the failure.
3. acct_B is B's account identifier.
4. PUB-B is B's public verification key.
5. time denotes the date and time of the daily response message.
6. reco_offline_limit contains the recommended off-line limit, which the IAP 40 suggests that the seller 20 should use as the off-line limit. The offline limit is the maximal amount of purchases per day that the buyer 10 can do, before an on-line confirmation from the IAP 40 is required
7. total_lim contains the total limit on daily spending, to be imposed by the various system components (hardware and software).
8. salt3 contains a random or pseudorandom value generated by the IAP 40 and is used to protect total_lim and real_bal from guessing (dictionary) attacks
9. real_bal contains the previous day's balance for the buyer 10 on record at the IAP 40. Note that the balance at the IAP 40 (real_bal) may be less than the balance at the buyer 10, if some payment orders are lost.

The buyer 10 uses the received values of total_lim, salt3, and real_bal to compute the hash value H(total_lim, salt3, real_bal). The buyer 10 then uses the IAP's public verification key PUB_IAP, together with the values Daily_res, OK/fail_code, acct_B, PUB_B, time, reco_offline lim, and H(total_lim, salt3, real_bal), to validate the signature S_IAP(Daily_res, OK/fail_code, acct_B, PUB_B, time, reco_offline_lim, H(total_lim, salt3, real_bal)). The process of validating the signature depends on the particular signature algorithm, and is unimportant with respect to the operation and functioning of the protocol itself. If the OK/fail_code field indicates "OK" and the time field contains correct information, and the signature is determined to be valid, then the daily response message and certificate are accepted; otherwise the daily response message and certificate are rejected.

A buyer 10 can use the MiniPay protocol only after running the registration and routing protocol to register his public key and after running the daily buyer protocol to receive a valid certificate. Thereafter, the buyer 10 can continue to use the MiniPay protocol by running the daily buyer protocol at the beginning of each day, in order to receive a fresh certificate. The payment order also includes a daily certificate, which is provided daily to the buyer 10 by the IAP 40. The purchase protocol is described as follows: B first sends S:

1. Daily_Certificate={Daily_res, OK/fail_code, acct_B, PUB_B, time, reco_offline_limit, total_lim, salt3, real_bal, and S_IAP(Daily res, OK/fail_code, acct_B, PUB_B, time, reco_offline_lim, H(total_lim, salt3, real_bal))} and
2. Payment_Order={Order, amount, day_total, acct_B, time, URL, acct_S, and S_B(Order, amount, day_total, acct_B, time, URL, acct_S) }.

The wallet sends a payment order only if the buyer 10 has enough money to pay for the purchase, i.e., if the amount of the purchase is less than the current balance kept by the wallet.

1. Daily-Certificate is the certificate that the buyer 10 receives daily from the IAP 40.

2. Order indicates that the message is a payment order message.
3. amount contains the amount of the payment.
4. day_total contains the total amount spent by this buyer 10 in this seller 20 on this day, including this purchase.
5. acct_B is B's account identifier.
6. time denotes the date and time of the order message.
7. URL contains the URL of the desired HTML page or service purchased by the buyer 10. NOTE that the MiniPay protocol is designed specifically to provide a means for the payment of information purchased and delivered to the buyer 10 over the Internet.
8. acct_S is the seller's account identifier, and is obtained from the HTML page provided by the seller's HTTP server, using a Common Gateway Interface (CGI).

The seller 20 validates the Daily_Certificate with the IAP's public verification key PUB_IAP using a procedure that is the same as the procedure used by the buyer 10 to validate the Daily_Certificate (see the daily buyer protocol). If the Daily_Certificate is valid, then the certificate and B's public key PUB_B are accepted; otherwise the certificate and B's public key are rejected.

The seller 20 uses B's public verification key PUB_B, together with the values Order, amount, day_total, acct_B, time, URL, acct_S, to validate the signature S_B(Order, amount, day_total, acct_B, time. URL, acct_S). The process of validating the signature depends on the particular signature algorithm, and is unimportant with respect to the operation and functioning of the protocol itself. If the signature is determined to be valid, then further consistency checking is performed; otherwise the order message is rejected.

The seller 20 validates the payment order message by performing consistency checking on certain values, e.g., on the amount, day_total, acct_B, time, and acct_S fields. If the signed payment order message is valid and the amount is within prescribed limits (i.e., if the total purchase by this buyer 10 in this seller 20 on this day is less than the off-line limit), then the payment order is accepted and the seller 20 permits the requested information, game, or loadable software to be provided (downloaded) to the buyer 10 or it permits the requested service to be provided to the buyer 10 (e.g. access to a requested site). If the buyer 10 has spent over the off-line limit with this seller 20 on this day, then the seller 20 may run the extra-spending protocol to determine whether the IAP 40 will approve the additional amount needed to complete the transaction, in which case the seller 20 will accept the payment order.

The MiniPay wallet is conveniently implemented with a Netscape plug-in (see Netscape plug-in information, at http://home.netscape.com/comprod/development-partners/plugin_api/index.html or Programming Netscape Plug-Ins, Zan Oliphant, 1996, Sams.net, ISBN 1-57521-098-3 or D. R. Brewer, Netscape One Sourcebook, John Wiley and Sons, New York, 1997). Plug-ins are programs written in C or C++ that can extend the capabilities of the Netscape Navigator Web browser. The MiniPay wallet plug-in is a trusted piece of code installed by the user (buyer 10). The MiniPay wallet plug-in has access to secure files stored on the buyers' machine, or possibly on a smartcard. The MiniPay plug-in solution works well with Netscape browsers (version 3 and higher) and with Microsoft Internet Explorer (version 3), although the solution method described here is one based on a Netscape plug-in.

MiniPay is designed so that a user buys information or service as part of the normal browsing process. A user browses by clicking on different hyper-links (URLs) for different merchants, which results in different HTML pages being displayed by the user's browser (e.g., the Netscape browser running on the user's personal computer) The merchant's HTML page will typically offer information or services to be purchased, together with the terms and conditions of the offer. The information or services for sale are assumed to be invoked via a hyper-link (URL) in the merchant's HTML page. A merchant (seller 20) desirous of enabling payment orders using MiniPay, must replace the existing hyper-link in his HTML page (implemented via an <A HREF= . . . >tag) with an appropriate <EMBED> tag. That is, we replace one string of data with another, somewhat longer, string of data.

The <EMBED>tag provides the following:
1. It specifies the plug-in (wallet) to be loaded by the browser.
2. It specifies the size of the MiniPay link window.
3. It specifies the content to be displayed by the plug-in (wallet) in the MiniPay link window.
4. It specifies the hyper-link pointing to the item to be purchased.
5. It specifies the cost of the hyper-link pointing to the item to be purchased (e.g., in cents).
6. It specifies the identifier of the seller 20 (acct_S).
7. It specifies the identifier of the Common Gateway Interface (CGI) script for MiniPay at the seller 20.
8. It specifies a page with instructions on installing MiniPay (invoked automatically by the browser if the MiniPay plug-in is not installed).

The plug-in content in the HTML page (to be viewed) references a Multipurpose Internet Mail Extensions (MIME) file type that must be supported by a specific plug-in, in order for the content to be displayed/viewed. When the Netscape Navigator (browser), or any compatible browser, encounters the <EMBED> tag, the browser verifies that the required plug-in, needed to display the content corresponding to that <EMBED> tag, has been installed. If so, then the browser will invoke the plug-in to view/display the MIME content corresponding to the EMBED tag. Otherwise, the Netscape Navigator (browser), opens a pop-up window, which will allow the user to download and install the required plug-in. Once the plug-in has been installed, it can be reused repeatedly without downloading it each time.

Using the information contained in the <EMBED> tag, the MiniPay plug-in displays a pop-up window with all the necessary information to permit the user to initiate a MiniPay payment order. An understanding of these steps is not important to the present invention.

In general, the advantage of a plug-in is that one party who designs an HTML page need not design the plug-in. Plug-ins designed by third parties can be easily integrated into HTML pages designed by others. Consequently, each merchant is not required to design and provide his own MiniPay wallet plug-in. Instead, each merchant can provide an <EMBED> tag in his HTML page, which in turn will invoke a MiniPay wallet plug-in, designed and provided by a single third party. Netscape has a complete directory of available third-party plug-ins. This makes it convenient for merchants to implement MiniPay and provide a MiniPay capability to buyers.

The present invention contemplates that the present MiniPay architecture described above be extended and modified. In one embodiment of the present invention, the MiniPay architecture is extended and modified in the following ways:

1. An evaluator (to be described) is added to the architecture model.
2. A new protocol flow is added between the buyer and evaluator to permit the buyer to receive product evaluation information (survey results) from the evaluator.
3. A new protocol flow is added between the buyer and evaluator to permit the buyer to answer questions about a product contained in a survey questionnaire, i.e., to take product surveys.
4. A new protocol flow is added between the evaluator and IAP to permit the evaluator to verify that completed survey questionnaires, received by the evaluator, did in fact come from buyers who purchased the products being evaluated in the survey questionnaires.
5. The payment order message in the MiniPay purchase protocol is modified to include a few additional data elements so that the IAP will have the necessary information required by the protocol flow between the IAP and evaluator.

It is also necessary for the IAP to agree to allow the buyer's signature key PRIV_B to be used to sign information not directly associated with MiniPay payments. However, a simpler overall design is possible if the parties solve their individual requirements by using a common integrated architecture model.

As noted above, in the conventional MiniPay system, the IAP has a public and private key pair (PUB_IAP, PRIV_IAP) that are used for signing messages. In the extended MiniPay system, the IAP also has a public and private key pair (PUB_IAP, PRIV_IAP) used for key encryption. Typically, the key pair used for key encryption would be different from the key pair used for signing. But, the present invention is not limited in this way. The IAP could have one key pair used for both signing and key encryption or it could have two different pairs of keys, one pair for signing and another pair for key encryption. The key encryption key pair permits the evaluator to employ a hybrid encryption system wherein information to be protected is encrypted with a symmetric key (e.g., a DES key) and the symmetric key is in turn encrypted with the IAP's public key. The key encryption public key (PUB_IAP) is stored in a certificate signed by a certification authority, and this certificate is sent to the evaluator using a separate protocol, not part of MiniPay or extended MiniPay. It is assumed that the evaluator has the public key of the certification authority initialized in his system, and that this key is used to validate the certificate containing the public key PUB_IAP.

In the extended MiniPay system, the evaluator has a public and private key pair (PUB_E, PRIV_E) used for key encryption. This key pair permits the buyer to employ a hybrid encryption system wherein information to be protected is encrypted with a symmetric key (e.g. a DES key) and the symmetric key is in turn encrypted with the evaluator's public key. The key encryption public key (PUB_E) is stored in a certificate signed by a certification authority, and this certificate is sent together with the survey questionnaire requested by a buyer. It is assumed that the buyer has the public key of the certification authority initialized in his system, and that this key is used to validate the certificate containing the public key PUB_E.

FIG. 2 is a block diagram illustration of an extended MiniPay system, modified in accordance with the present invention. FIG. 2 contains the four components of a normal MiniPay system (buyer 10, seller 20. ISP 30 and IAP 40) as well as one new component (evaluator 50). The evaluator 50 collects and distributes survey data. Prior to making a purchase, the buyer 10 can receive survey results for different products. And, after purchasing a product, the buyer 10 can take a survey, thus allowing the buyer to provide survey inputs to the evaluator 50.

FIG. 3 illustrates a representative client-server network environment in which the present invention may be practiced. The environment of FIG. 3 comprises the following components:

1. A user who purchases information or services via the Internet, denoted buyer 10.
2. A merchant who offers on-line information or services for sale, denoted seller 20.
3. The seller's billing system, typically a bank or an Internet service provider (ISP), denoted ISP 30.
4. The buyer's billing system, typically an Internet access provider (IAP) or a phone company (Telco PTT) or a financial processor, denoted IAP 40.
5. A service provider that collects product survey information and distributes survey results to users (or buyers), denoted evaluator 50.

In the preferred embodiment, the components of FIG. 3 are connected to the Internet, and can communicate using standard Internet communication protocols. The components of FIG. 3 interact as follows:

At step 60, the buyer 10 requests one or more HTML pages from the seller 20. The HTML page(s) contain a list of one or more products offered for sale. Each product has an associated URL or hyper-link that allows the buyer 10 to access or obtain the product (information or service). At step 61, the buyer 10 receives the requested HTML page(s) from the seller 20.

At step 62, the buyer 10 requests one or more HTML pages from the evaluator 50. The HTML page(s) contain product evaluation information for one or more products. The product evaluation information is derived from product survey information sent to the evaluator 50. At step 63, the buyer 10 receives the requested HTML page(s) from the evaluator 50.

At step 64, the buyer IO sends a payment order message to seller 20 to purchase a product or service. The product or service is identified by a particular URL in one of the seller's HTML pages. At step 65, the buyer 10 receives the purchased HTML page(s) from the seller 20.

At step 66, the buyer 10 requests a product survey questionnaire from the evaluator 50, in order that the buyer 10 can express an opinion about the product that he purchased, accessed, and viewed or used on-line. Note that in situations where the buyer 10 downloads the purchased information to his own system for later use, the buyer 10 would not have an opportunity to take a survey on-line via a link from the seller's HTML page. In that case, the buyer 10 would be required to take the survey at a later time. At step 67, the buyer 10 receives the requested product survey questionnaire.

At step 68, the buyer 10 sends the completed product survey questionnaire to the evaluator 50.

At step 69, the seller 20 sends aggregated payment orders received from all buyers to the ISP 30. At step 70, the ISP 30 sends aggregated payment orders from all of its sellers to the appropriate corresponding IAP(s) 40.

At step 72, the evaluator 50 requests proof from the IAP 40 that the completed survey questionnaire received from the buyer 10 at step 66 was submitted by a buyer who actually purchased the product identified in the completed survey questionnaire. At step 74, the evaluator 50 receives proof from the IAP 40 that the buyer 10 who sent the evaluator 50 a completed survey questionnaire at step 66 is in fact a legitimate buyer 10 who did purchase the product identified in the completed survey questionnaire.

Steps 60, 61, 65, 69, and 70 are existing steps in the MiniPay architecture; step 64 is a modified step in the MiniPay architecture These steps are described above. Steps 62, 63, 66, 67, 68, 72, and 74 are the new steps added to the MiniPay protocol, and are the subject of the present invention. Steps 62 and 63 permit the evaluator 50 to distribute product evaluation information, or survey results, to buyers. Steps 66, 67, 68, 72 and 74 permit the evaluator 50 to receive and validate product survey questionnaires received from buyers.

FIG. 4 is a block diagram illustration of a modified MiniPay purchase protocol. At step 64, the buyer 10 sends the seller 20 a copy of the buyer's daily certificate, denoted Daily_Certificate 75, and a payment order, denoted Mpay_Order 76 consisting of OldData, NewData and a signature calculated on the concatenation of OldData and NewData using the buyers signing key PRIV_B. OldData denotes the data sent in the unmodified MiniPay protocol described above. OldData contains the following data elements: Order, amount, day_total, acct_B, time, URL, and acct_S (see above). NewData denotes the new data sent in the modified payment order, and consists of the following data elements:

1. An authentication code, denoted Auth_B, used by the IAP 40 to verify that a completed survey questionnaire received by the evaluator 50 was submitted by a buyer 10 who purchased the product identified in the completed survey questionnaire.
2. The name or identifier of the purchased product, denoted ID_Product.

Upon receipt, the seller 20 validates the Daily_Certificate 75 with the IAP's public verification key PUB_IAP using a procedure that is the same as the procedure used by the buyer 10 to validate the Daily_Certificate (see the daily buyer protocol). If the Daily_Certificate is valid, then the certificate and B's public key PUB_B are accepted; otherwise the certificate and B's public key are rejected.

The seller 20 then uses B's public verification key PUB_B, together with the values 1. OldData={Order, amount, day_total, acct_B, time, URL, acct_S} and
2. NewData={Auth_B, ID_Product} to validate the signature S_B(OldData, NewData). The process of validating the signature depends on the particular signature algorithm, and is unimportant with respect to the operation and functioning of the protocol itself. If the signature is determined to be valid, then further consistency checking is performed on Old Data, as described in the purchase protocol above, otherwise the payment order message is rejected.

FIG. 5 is a block diagram illustration of the survey protocol, which permits a buyer 10 to send a completed survey questionnaire to the evaluator 50. At step 68, the buyer 10 sends the evaluator 50 the following four data elements:

1. An encrypted key block PUB_E(Survey1, K1, K2, Rcode_B) 78 consisting of data elements encrypted with the public key of the evaluator 50 (PUB_E). The data elements in the encrypted key block 78 are as follows:
   a. Survey1: A header indicating that the key block is a survey key block.
   b. K1: A secret key used to compute an HMAC—a Message Authentication Code (MAC) computed with a hashing algorithm (see M. Bellare et al. "Keying Hash Functions for Message Authentication," Advances in Cryptology—Crypto 96 Proceedings, Lecture Notes in Computer Science Vol. 1109, N. Koblitz ed., Springer-Verlag. 1996).
   c. K2: A secret key used for encipherment with a symmetric key cryptographic algorithm.
   d. Rcode_B: A secret codeword randomly generated by the buyer's system.
2. DataElements 80 consist of the following:
   a. ID_IAP: The identifier of the IAP 40.
   b. acct_B: The buyer's (B's) account identifier.
   c. ID_Product: The name or identifier of the purchased product.
   d. Time: The date and time that appears in the payment order sent by the buyer 10 at step 64.
3. HMAC(survey_questionnaire_responses) 82 denotes a message authentication code computed on survey_questionnaire_responses using a hashing algorithm and the secret key K1, i.e., using the HMAC algorithm and key K1. HMAC functions as an integrity value that assures the evaluator 50 that the responses actually originate from the buyer 10 and have not been altered. Other means, such as digital signatures, may be used alternatively to generate integrity values, as described further below.
4. K2(survey_questionnaire_responses) 84 denotes the survey_questionnaire_responses encrypted with K2 using a symmetric key cryptographic algorithm.

K2 is used to encrypt the survey_questionnaire_responses. Encrypting the survey_questionnaire_responses allows the buyer 10 to keep his responses secret. This encryption step is optional, and would be used only in situations where the buyer 10 or evaluator 50 expressly wishes to keep the responses private.

K1 is used to compute a message authentication code on the survey_questionnaire_responses. HMAC is one type of message authentication code, although it is preferred since HMAC can be computed quickly and provides high security.

The key block is encrypted in order to protect the secrecy of the two keys, K1 and K2, and to protect the secrecy of the randomly generated codeword, Rcode_B. Rcode_B is kept secret in order to prevent a bogus survey_questionnaire_responses from being accepted by the evaluator 50. Rcode_B is the only value that the evaluator 50 has available to validate the survey protocol message (FIG. 5).

FIG. 6 is a block diagram illustration of the survey reconciliation protocol, which permits the evaluator 50 to verify that received completed survey questionnaires did in fact come from buyers who purchased the products identified in the completed survey questionnaires.

At step 72 in FIG. 6, the evaluator 50 sends the IAP 40 a batched request consisting of the following data elements:

1. An identifier of the evaluator, ID_Evaluator 85, so the IAP 40 will know the evaluator 50 who created the request.
2. An encrypted key block PUB_E(Survey2, K3, K4) 86 consisting of the following
   i. Survey2: A header indicating that the key block is a survey key block.
   ii. K3: A secret key used for encipherment with a symmetric key cryptographic algorithm.
   iii. K4: A secret key used to compute an HMAC—a Message Authentication Code (MAC) computed with a hashing algorithm.
3. A ListOfclaimedPurchases 88 consisting of a list of n items {P1, P2, . . . , Pn} where each item P in the list contains the following data elements:

i. acct_B: The value of acct_B received from the buyer 10 in the survey protocol (step 66).
ii. ID_Product: The value of ID_Product received from the buyer 10 in the survey protocol (step 66).
iii. Time: The value of time received from the buyer 10 in the survey protocol (step 66).
iv. K3(Rcode_B): The value of Rcode_B received from the buyer 10 in the survey protocol (step 66) encrypted with the key K3.

4. An HMAC 90 computed on the completed ListOfclaimedPurchases using the secret key K4.

At step 74 in FIG. 6, the IAP 40 sends the evaluator 50 a batched response consisting of the following data elements:

1. An identifier of the IAP 40, ID_IAP 91, so the evaluator 50 will know the IAP 40 who created the response.
2. A ResponseList 92 consisting of a list of n items {R1, R2, . . . , Rn} where each R contains the following data elements:
   i. P={acct_B. ID_Product, time, K3(Rcode_B)}. The IAP 40 echoes back the value of P that it received from the evaluator 50.
   ii. An OK/fail_code, where OK indicates that the buyer 10 with acct_B purchased a product whose name or identifier is given by ID_Product on the date and time specified by the data element "'time;" and fail_code is a failure code indicating that the IAP 40 cannot verify that the buyer 10 purchased the product on the specified date and time, together with an explanation for the failure.
3. A signature S_IAP(Survey3, ResponseList) 94 generated on the data block (Survey3, ResponseList) using the IAP's private signing key PRIV_IAP. Survey3 is a header indicating that the data block is a survey signature block.

In the network of components described in FIG. 3, the buyer IO is a client, and the seller 20 and evaluator 50 are servers.

FIG. 7 is a block diagram illustration of the buyer's system 102 connected to the Internet 100. The buyer's system 102 consists of a browser 104, such as the Netscape Navigator browser, a survey plug-in 106, and a MiniPay wallet plug-in 108.

Browser 104 is used to access the World Wide Web or Internet. It is used to access HTML pages or documents from the seller's and evaluator's servers. It is also used to interact with the seller's and evaluator's servers. Given a pointer to a piece of information on the Internet, called a Universal Resource Locator (URL), the browser accesses that piece of information or operates in some way based on the contents of the URL. For hypertext Web documents, the browser communicates with the server using the HTTP protocol. Each page the browser loads from the Web is a single document. It is written in a language called HyperText Markup Language (HTML). Each HTML page includes the text of the document, its structure, any links to other documents, and images and other media. There are many different browsers available, although one of the most popular and widely used browsers is the Netscape Navigator browser.

The MiniPay wallet plug-in 108 performs certain processing steps required of the buyer's MiniPay system. The MiniPay wallet plug-in 108 is a modified version of the MiniPay wallet plug-in (described above), and is capable of performing the extra processing steps to prepare a modified payment order message described by this invention.

The survey plug-in 106 performs the processing steps needed to implement the survey protocol of the described survey system. The survey plug-in 106 enables the buyer's system to prepare and submit a completed survey questionnaire to the evaluator 50.

Like the MiniPay wallet plug-in 108, the survey plug-in 106 is a trusted piece of code installed by the user (buyer 10). And, like the MiniPay wallet plug-in 108, the survey plug-in 106 has access to secure files stored on the buyer's machine, or possibly on a smartcard. The plug-in mechanism is described more fully above.

Like the MiniPay system, the survey system makes use of an <EMBED> tag. In this case, the merchant must place a survey system <EMBED> tag in one of the HTML pages purchased by the buyer 10, preferably at a convenient location where it will be seen and easily recognized after the buyer 10 has finished viewing or working with the purchased URL-addressed-product.

The <EMBED> tag provides the following:

1. It specifies the plug-in (survey plug-in) to be loaded by the browser.
2. It specifies the size of the survey link window.
3. It specifies the content to be displayed by the plug-in (survey plug-in) in the survey link window.
4. It specifies the hyper-link pointing to the survey questionnaire.
5. it specifies the identifier of the evaluator 50 (ID_Evaluator).
6. It specifies the identifier of the Common Gateway Interface (CGI) script for the survey system at the evaluator 50.
7. It specifies a page with instructions on installing the survey system (invoked automatically by the browser if the survey system plug-in is not installed).

The use and functioning of the <EMBED> tag is more fully explained above.

FIG. 8 is a block diagram illustration of a typical Internet server system 110, and is representative of the seller's and evaluator's systems. Server system 110 consists of a web server 112 connected to the Internet 100, which can invoke one or more scripts 114, which can invoke one or more other programs 116.

Whenever a user points his browser at a Web document, the browser communicates with the server to get the document. A Web server uses the HTTP protocol to listen for requests for files from browsers. It then delivers the files and any included images referred to by the file. Web servers can also handle commands sent back from the browser.

The Web Server 112 is a program that processes URL requests from browsers. Each requested URL points to a script 114. Each script 114 is a program invoked by Web Server 112 that runs on the Server system 110. Script 114 can also invoke other programs 116. Taken together, Web Server 112, Script 114 and Other Programs 116 are a powerful combination capable of performing the necessary computational steps required by the seller's portion of the modified MiniPay system and the evaluator's portion of the survey system.

FIG. 9 is a flowchart of processing steps performed by the buyer 10. At step 60, buyer's browser requests URL for HTML page(s) from seller 20. At step 61, buyer's browser receives HTML page(s) from seller 20.

At step 202, buyer's browser views HTML page(s) received from seller 20 and finds a product of interest, that the buyer 10 might desire to purchase. This includes the following: name of product, description of product, and a MiniPay link (or URL) that buyer 10 can 'point and click' on in order to initiate a MiniPay payment order. It also includes a hyper-link (or URL), which the buyer 10 can 'point and click' on to obtain product evaluation information for the product of interest.

At step 204, buyer 10 points and clicks on the hyper-link to obtain product evaluation information for the product of interest. At step 62, buyer's browser requests URL for HTML page(s) from evaluator 50, i.e., the buyer 10 requests survey results for the product of interest by clicking on the evaluator's hyper-link. At step 63, buyer's browser receives HTML page(s) from evaluator 50. At step 205, buyer's browser views HTML page(s) received from evaluator 50. The buyer 10 uses the product evaluation information in deciding whether to purchase the product or not. For the purposes of the present invention we assume that the buyer 10 decides to purchase the product.

At step 206, buyer 10 points and clicks on the MiniPay link for the product of interest, which initiates the MiniPay system protocol. At step 208, buyer's system prepares a payment order, see FIG. 13. At step 64, buyer's browser requests the purchased HTML page(s) from the seller 20, which includes the payment order. At step 65. buyer's browser receives the purchased HTML page(s) from the seller 20.

At step 210, buyer's browser views purchased HTML page(s) received from seller 20. Once the buyer 10 receives a first HTML page, that page may contain 'free' hyper-links to other HTML pages. The buyer 10 can continue to view the purchased HTML pages for as long as he wants, or until some prescribed time limit has been reached, according to the terms and conditions of the purchase agreement. The purchased HTML page(s) also contain a survey link that permits the buyer 10 to fill in a survey questionnaire for the purchased product. Submission of a survey questionnaire is optional, although for the purpose of describing the present invention we shall assume that the buyer 10 decides to submit a survey questionnaire.

At step 212, buyer 10 points and clicks on the survey link in the purchased HTML page(s). At step 66, buyer's browser requests HTML page(s) containing survey questionnaire from the evaluator 50. At step 67, buyer's browser receives HTML page(s) containing survey questionnaire from the evaluator 50, and the signed certificate containing the evaluator's public key PUB_E.

At step 213, buyer's system validates the certificate containing the evaluator's public key PUB_E. We assume that the certificate is signed with the public key of a certification center, and that the public key of the certification center has been previously stored in the buyer's wallet. The process of validating the signature depends on the particular signature algorithm, and is, unimportant with respect to the operation and functioning of the protocol that uses the public key PUB_E. The received and validated public key PUB_E is then stored in the buyer's wallet.

At step 214, buyer's browser views HTML page(s) received from evaluator 50. The buyer 10 answers the questions in the survey questionnaire, and indicates that he is finished taking the survey. At step 216, buyer's system prepares a survey response, see FIG. 14. At step 68, buyers' browser sends the survey response to the evaluator 50 containing the answers to the survey questionnaire.

FIG. 13 is a flowchart of processing steps associated with step 208 of FIG. 9. At step 220, buyer 10 obtains daily_certificate, amount, day_total, and acct_B from the MiniPay wallet plug-in 108, which have been received previously as part of the normal MiniPay system operation (described above), and stored in the buyer's wallet. At step 222, buyer 10 reads time from the buyer's system's time-of-day clock, which is also a step performed under the normal MiniPay system operation. At step 224, buyer 10 obtains the URL of the to-be-purchased HTML page(s), acct_S and ID_Product from the <EMBED> tag in the seller's HTML page. Note that ID_Product is not yet defined under the MiniPay architecture. Therefore, unless ID_Product can be derived or obtained from data in the seller's HTML page, ID_Product will need to be added to the <EMBED> tag in the seller's HTML page.

At step 226, buyer 10 randomly generates Rcode_B, stores Rcode_B in the wallet for later use, and generates authentication code Auth_B from Rcode_B and other data. Auth_B is a non-secret value, whereas Rcode_B is a secret value. The method for calculating Auth_B from Rcode_B and other data is more fully explained below.

At step 228, the value OldData is created by concatenating the parameter values "Order", amount, day-total, acct_B, time, URL, and acct_S. At step 230, the value NewData is created by concatenating the parameter values Auth_B, and ID_Product. At step 232, the values of OldData and NewData are signed with the buyer's private signing key PRIV_B. The process of signing—an operation well known in the art—depends on the particular signature algorithm, and is unimportant to the operation and functioning of the present invention.

At step 234, buyer 10 obtains the value of ID_IAP, the identifier of the IAP 40 for that buyer 10. ID_IAP is a value previously initialized in the buyer's wallet. At step 236, buyer 10 creates DataElements 80, which contains the values ID_IAP (step 234), acct_B (step 220), ID_Product (step 224), and time (step 222), and stores DataElements in the buyer's wallet.

FIG. 14 is a flowchart of processing steps associated with step 216 of FIG. 9. At step 250, the buyer 10 obtains the public key PUB_E from the buyer's wallet where it was previously stored (step 213 of FIG. 9). At step 252, the buyer 10 randomly generates the keys K1 and K2. At step 254, the buyer 10 obtains the value of Rcode_B, previously generated and stored in the buyer's wallet in step 226 of FIG. 13. At step 256, the buyer 10 encrypts the header "Survey1," K1, K2, and Rcode_B with the public key PUB_E to produce the encrypted value PUB_E(Survey1, K1, K2, Rcode_B) 78.

At step 258., the buyer 10 obtains DataElements={ID_IAP, acct_B, ID_Product, time} 80 from the buyer's wallet, previously created and stored in the buyer's wallet in step 236 of FIG. 13. At step 260, the buyer 10 creates a message authentication code, denoted HMAC(K1, survey_questionnaire_responses) 82, on the survey questionnaire responses produced in step 214 of FIG. 9 using an HMAC algorithm and key K1. At step 262, buyer 10 encrypts the survey questionnaire responses using the key K2 to produce the encrypted value K2(survey_questionnaire_responses) 84.

FIG. 10 is flowchart of processing steps performed by the seller 20. At step 60, the seller's server receives a URL request for HTML page(s) that describe the seller's products offered for sale, where each product has an associated MiniPay link. At step 61, seller's server passes requested HTML page(s) back to buyer's browser. At step 64, seller's server receives a URL request from a buyer 10 for HTML page(s) to be purchased, together with a payment order.

At step 302, seller's system validates and processes the payment order. The steps involved in validating and processing the modified payment order in the modified MiniPay system are essentially the same as the steps involved in validating and processing a payment order in the (unmodified) MiniPay system, described above, except that the seller's system must handle data consisting of OldData and NewData instead of data consisting only of OldData, which may be viewed merely as an extension of the data in OldData, and the seller's system must also verify that the ID_Product contained in NewData agrees with the URL in OldData, i.e., each specifies the same product.

At step 65, seller's server passes purchased HTML page (s) to buyer's browser.

FIG. 11 is a flowchart of processing steps performed by the IAP 40. At step 72, the IAP's system receives a proof of purchase request message from the evaluator 50 requesting verification that the list of buyers contained therein did in fact purchase the products they claimed to have purchased.

At step 402, the IAP's system processes the input received from the evaluator 50, see FIG. 17. If a failure code is returned by this processing step, then a response message is sent to the evaluator 50 indicating that his proof of purchase request has been rejected. Otherwise, processing continues with step 404.

At step 404, the IAP's system prepares a response for the evaluator 50, see FIG. 18.

At step 74, the IAP's system sends a proof of purchase response message to the evaluator 50 indicating the buyers, in the list of buyers received from the evaluator 50, that purchased the products they claimed to have purchased.

FIG. 17 is a flowchart of processing steps associated with step 402 of FIG. 11. At step 420, the IAP 40 obtains the private key of the IAP 40, denoted PRIV_IAP, previously generated and stored in the IAP's system. At step 422, the IAP 40 decrypts the received value of PUB_IAP(Survey2, K3, K4) 86 with the key PRIV_IAP to recover the values of Survey2, K3, and K4. At step 424, the IAP 40 verifies that the header is "survey2," indicating that this is a valid key survey key record from an evaluator 50. The IAP 40 continues if the header is correct; otherwise it stops. At step 426, the IAP 40 computes a message authentication code on the received ListOfclaimedPurchases 88 using the HMAC algorithm and the key K4. At step 428, the IAP 40 compares the calculated message authentication code with the received value of HMAC(K4, ListOfclaimedPurchases) 90 for equality. If the values are equal, the IAP 40 returns OK. Otherwise, it returns an appropriate fail_code.

FIG. 18 is a flowchart of processing steps associated with step 404 of FIG. 11. Note that it is assumed that the IAP 40 receives batched daily deposits from various ISPs, who in turn have received batched daily deposits from various sellers. It is further assumed that the daily deposits consist of payment orders, or data records containing equivalent or comparable information. It is still further assumed, for every payment order initiated by a buyer 10 in a particular IAP 40, that the IAP 40 will receive and store (for a defined period) at least enough information to carry out the processing steps associated with step 404 of FIG. 10. More specifically, it is assumed that the stored information corresponding to each payment order will contain, at least, the following data elements: acct_B, ID_Product, time, and Auth_B.

At step 440, the IAP 40 obtains the received key K3. At step 442, for each P={acct_B, ID_Product, time K3(Rcode_B)} in the received ListOfclaimedPurchases= {P1, P2 . . . , Pn} 88, the IAP 40 decrypts the encrypted value K3(Rcode_B) to recover the plaintext value Rcode_B.

At step 444, for each P={acct_B, ID_Product, time K3(Rcode_B) } in the received ListOfclaimedPurchases= {P1, P2, . . . , Pn} 88, the IAP 40 creates a corresponding value R={P, OK/fail_code }, and collects these so-created values of R together to form ResponseList={R1, R2 . . . , Rn } 92, where OK/Fail_code in each of the so-produced R values contains "OK" or fail_code depending on whether the associated Rcode_B is valid or not valid. Rcode_B is validated against its corresponding value of Auth_B, as follows: For each value of P, the parameters acct_B, ID_Product, and time are used to locate the payment order record, or its equivalent record, corresponding to these said parameters, previously stored in the IAP's system (see the note above). The parameters acct_B, ID_Product, and time uniquely identify the payment order record, and hence uniquely identify the value of Auth_B, which is also stored in the same payment order record. For a given value of Rcode_B, and its corresponding value of Auth_B, the process of validating Rcode_B has the following steps:

1. A value f(Rcode_B, other_data) is computed on Rcode_B and (possibly) other data using a function f.
2. If the computed value of f(Rcode_B, other_data) is equal to Auth_B, then Rcode_B is valid, otherwise Rcode_B is not valid.

Those skilled in the art will appreciate that there are many possible functions f and possibly many different types of other_data that could be used in the computation of f(Rcode_B, other_data). The present invention describes one method for computing f(Rcode_B, other_data), although those skilled in the art will appreciate that the invention is not limited to or bound by this one method.

At step 446, the IAP 40 obtains its private key PRIV_IAP used for signing. Note that the IAP 40 will have one key pair for signing and another key pair for key encryption, although these keys are not indexed or distinguished as such in the present invention. At step 448, the IAP 40 forms a signature record containing the header "Survey3" and ResponseList 92, and signs this signature record with the private key PRIV_IAP to produce the signature S_IAP(Survey3, ResponseList) 94.

FIG. 12 is a flowchart of processing steps performed by the evaluator 50. At step 62, the evaluator's server receives a URL request for HTML page(s) containing survey results for a particular product. At step 63, the evaluator's server passes requested HTML page(s) to buyer's browser.

At step 66, the evaluator's server receives a URL request for HTML page(s) containing a survey questionnaire. At step 67, the evaluator's server passes requested HTML page(s) to buyer's browser, along with a signed certificate containing the public key PUB_E of the evaluator 50. At step 68, the evaluator's server receives a survey response from the buyer 10, containing the answers to the survey questionnaire.

At step 502, the evaluator's system processes the survey response received from the buyer 10 and prepares a proof of purchase request for the IAP 40, see FIG. 15. At step 504, at a later time, the evaluator's system prepares a proof of purchase request message for possibly several survey questionnaire responses received from one or more buyers, see FIG. 16. At step 72, the evaluator's system sends a proof of purchase request message to the IAP 40, requesting verification that the list of buyers contained therein did in fact purchase the products they claimed to have purchased. At step 74, the evaluator's system receives a proof of purchase response message from the IAP 40, indicating the buyers, in the list of buyers sent to the IAP 40 in the proof of purchase request message, that purchased the products they claimed to have purchased. At step 506, the evaluator's system processes the proof of purchase response message, which includes designating those survey responses which are valid survey responses coming from valid buyers, see FIG. 19. At step 508, the evaluator's system uses the valid survey responses to create or update its product evaluation information (not described in the present invention).

FIG. 15 is a flowchart of processing steps associated with step 502 of FIG. 12. At step 520, the evaluator 50 decrypts PUB_E(Survey1, K1, K2, Rcode_B) 78 with the evaluator's private key PRIV_E to obtain the values Survey1, K1, K2, Rcode_B. At step 522, the evaluator 50 verifies that the received header "Survey1" is correct, indicating that this is a survey key block prepared by a buyer 10.

At step 524, the evaluator 50 calculates a value of HMAC on the received survey questionnaire responses using the HMAC algorithm and the received key K1. At step 526, the evaluator 50 compares the received value of HMAC(K1, survey_questionnaire_responses) with the calculated value of HMAC for equality. If the values compare equal, then the survey questionnaire responses are provisionally accepted and processing continues with step 528; otherwise, the survey questionnaire responses are rejected and further processing of the survey questionnaire responses is halted.

At step 528, the evaluator 50 decrypts the encrypted survey questionnaire responses, K2(survey_questionnaire_responses) using the received key K2. At step 530, the received values of acct_B, ID_Product, time, the decrypted value of Rcode_B and the decrypted survey questionnaire responses are stored as a logical record (denoted S) in the evaluator's system in a file corresponding to the IAP 40 whose identifier is ID_IAP. The survey questionnaire responses are not processed until after the evaluator 50 has received a proof of purchase response from the IAP 40.

FIG. 16 is a flowchart of processing steps associated with step 504 of FIG. 12. At step 540, for each IAP 40, the evaluator 50 processes the survey questionnaire response records S1, S2, ..., Sn via steps 542–550. Note that each IAP 40 has a different identifier, ID_IAP, which indexes the file containing the pending survey questionnaire responses records, previously created in step 530 of FIG. 15.

At step 542, for each IAP 40, the evaluator 50 randomly generates keys K3 and K4. At step 544, for each IAP 40, the evaluator 50 obtains the public key PUB IAP from the evaluator's system, where it has been previously stored and indexed by the identifier of the IAP (ID_IAP). It is assumed that the evaluator 50 has previously obtained PUB_IAP from the IAP 40 using a separate distribution protocol. For example, the evaluator 50 could periodically request a certificate from the IAP, containing PUB_IAP and signed by a certification authority whose public key is already available in the evaluator's system.

At step 546, for each IAP 40, the evaluator 50 creates a survey key block consisting of the header "Survey2" and the keys K3, and K4, and encrypts the survey key block with PUB_IAP to produce the encrypted value PUB_IAP (Survey2, K3, K4) 86. At step 548, for each IAP 40, the evaluator 50 does the following: For each record S in the file of pending survey questionnaire response records for that IAP 40, where each S contains the values acct_B, ID_Product, time, Rcode_B. and survey questionnaire responses, the evaluator 50 encrypts the value of Rcode_B with the key K4 to produce the encrypted value K4(Rcode_B), creates a new record P containing the values acct_B, ID_Product, time, and K4(Rcode_B), and then groups values of P into a list called ListOfclaimedPurchases 88. At step 550, for each IAP 40, the evaluator 50 computes a message authentication code on ListOfclaimedPurchases 88 using the HMAC algorithm and the key K4 to produce HMAC(K4, ListOfclaimedPurchases) 90.

FIG. 19 is a flowchart of processing steps associated with step 506 of FIG. 12. At step 570, the evaluator 50 obtains the IAP's public verification key PUB_IAP, previously received using a separate distribution protocol and stored in the evaluator's system. For example, the evaluator 50 could periodically request a certificate from the IAP 40, containing PUB_IAP and signed by a certification authority whose public key is already available in the evaluator's system. Note that the IAP 40 will have one key pair for signing and another key pair for key encryption, although these keys are not indexed or distinguished as such in the present invention. At step 572, the evaluator 50 validates the signature S_IAP (Survey3, ResponseList) 94 using the known header "Survey3", the received value of ResponseList 92, and the public key PUB_IAP. If the signature is valid, the evaluator 50 continues with step 574; otherwise, it rejects the ResponseList 92 and does not continue with step 574.

At step 574, the evaluator 50 locates the file of survey questionnaire response records for the IAP 40 corresponding to the received value of ID_IAP. At step 576, for each R in ResponseList 92, the evaluator 50 locates the corresponding survey questionnaire response record S in the located file of survey questionnaire response records (for ID_IAP) and marks the record S valid or invalid depending on the value of the OK/fail_code in R. That is, the evaluator 50 marks the record S valid if the OK/fail_code contains the value "OK"; otherwise, it marks the record S not valid.

Rcode_B is a randomly generated value. Auth_B is calculated from Rcode_B and possibly other data using a function f, as follows:

$$\text{Auth\_B} = f(\text{Rcode\_B, other\_data})$$

where f has the property that given a values of Auth_B and other_data, it is computationally infeasible to "work backwards" and compute Rcode_B.

However, if the length of Rcode_B is not large enough, an attacker may "work forwards" using trial and error until the correct value of Rcode_B is guessed. To accomplish this, the attacker selects a trial value of Rcode_B and computes f(Rcode_B. other data) and compares this for equality with the given value of Auth_B. If a match is found, the attacker has either found the correct value of Rcode_B or else he has found a synonym that works just as well. One can easily prevent an adversary from discovering the correct value of Rcode_B by ensuring that Rcode_B has enough different possible values. An Rcode_B with 128 bits or 180 bits is sufficiently large enough to prevent a guessing attack.

The problem of synonyms arises when Auth_B does not have enough different possible values. For example, if Auth_B has only 16 bits, then the attacker would, on average, only need to select $2^{16}$ trial values of Rcode_B before finding one such value of Rcode_B for which the computed value of f(Rcode_B, other_data) equals Auth_B. However, an Auth_B with 128 bits or 180 bits is sufficiently large enough to prevent synonyms from being found.

Another problem of potential concern is a dictionary attack on Rcode_B. In this case, the attacker picks trial values of Rcode_B and computes the corresponding Auth_B values and stores these in a dictionary, as follows:

$$Rcode\_B\langle 1\rangle, Auth\_B\langle 1\rangle$$
$$Rcode\_B\langle 2\rangle, Auth\_B\langle 2\rangle$$
$$\vdots$$
$$Rcode\_B\langle n\rangle, Auth\_B\langle n\rangle$$

The attacker then intercepts actual values of Auth_B and looks for a match in his dictionary. If a match is found, the attacker immediately knows the corresponding Rcode_B value. The dictionary attack can be foiled in different ways. One method is simply to make Rcode_B and Auth_B large enough so that the attacker cannot build a dictionary large enough to carry out the attack, even in the probabilistic sense. Yet, another method is to include some buyer-unique data in the computation of Auth_B, e.g., by defining Auth_B as a hash value computed on an input consisting of Rcode_B concatenated with a nonsecret identifier (ID) of the buyer 10.

The values Rcode_B and Auth_B are used as a means for the IAP 40, acting on behalf of the evaluator 50, to determine that a buyer 10 who has sent survey questionnaire responses to the evaluator 50, for a cited product, did in fact purchase the product from a seller 20 using MiniPay. This is accomplished as follows: At the time the buyer's system prepares a payment order, the system randomly generates an Rcode_B. The generated value of Rcode_B and other_data are used to compute f(Rcode_B other_data) and Auth_B is set equal to f(Rcode_B, other_data). The computed Auth_B is put in the signed payment order, which is sent first to the seller 20, then to the ISP 30, and finally to the IAP 40. In order words, IAP 40 eventually gets Auth_B in the payment order of the buyer 10. The buyer's system saves the value of Rcode_B so that when the buyer 10 takes a survey for the purchased product, the response going to the evaluator 50 will also include the value of Rcode_B, except that Rcode_B is encrypted with a key known to the evaluator 50. The evaluator 50 recovers Rcode_B and then sends it in encrypted form to the IAP 40, together with enough other information so that the IAP 40 can locate the appropriate payment order in question. The IAP 40 then performs an authentication check to determine that the received value of Rcode_B is correct. To do this, the IAP 40 recomputes f(Rcode_B, other_data) and compares it for equality with the value of Auth_B in the so-located payment order. If there is a match, the IAP 40 sends a response to the evaluator 50 indicating that the Rcode_B value is valid. The evaluator 50 then knows that the buyer 10 who submitted survey questionnaire responses for the claimed purchased product, did in fact purchase the product. In that case, the evaluator 50 can trust and beneficially use the survey questionnaire responses received from the buyer 10. Step 226 of FIG. 13 is the step in which the buyer 10 generates Rcode_B and computes Auth_B. Step 444 of FIG. 18 is the step in which the IAP 40 verifies Rcode_B against Auth_B.

One suitable method for calculating Auth_B would be to calculate an HMAC on the buyer's account number (acct_B) using Rcode_B as a key. In this case, function f is the HMAC algorithm, where Rcode_B is the secret key used in the HMAC computation and acct_B is the input data to the HMAC computation.

There are, in fact, many possible functions f suitable for calculating Auth_B. And, there are many possible types of other_data that could be used in the calculation of Auth_B. The reader will appreciate that the present invention is not limited to just one method for calculating Auth_B.

The described method for employing Rcode_B and Auth_B, while providing evidence that a party who submits survey questionnaire responses (takes a survey) is also one who purchased the product, is not foolproof. In the present invention, Rcode_B is used as a password to authenticate the buyer 10 to the evaluator 50 and to establish that the buyer 10 did in fact purchase the product claimed in the survey questionnaire responses. As such, without knowledge of the password one cannot trick the evaluator 50 into accepting survey questionnaire responses against products that have not been purchased. However, such a password scheme can lead to certain ambiguities. For example, it is not clear whether one should allow the buyer 10 to have the capability to take multiple surveys against one payment order for one purchased product—maybe or maybe not. If not, then the IAP 40 could keep track of the requests from evaluators for each such payment order, and it could inform the evaluator 50 in situations where a request for "proof of purchase" has been made by another evaluator 50 against the same payment. Another potential problem is that passwords (e.g., Rcode_B values) can be shared, and hence knowledge of Rcode_B alone does not provide undeniable proof that the entity taking the survey is in fact the entity who purchased the product. But, it does offer a degree of protection against the introduction of false survey information by malicious entities. And, in situations where any one survey response has only a small affect on the overall calculated statistic, it can offer an adequate degree of protection against the introduction of false survey information.

There are other methods, besides using Rcode_B and Auth_B, that would permit the evaluator 50 to verify that a buyer 10 who takes a product survey did in fact purchase the claimed product.

In one method, the buyer 10 signs the survey responses with his private key PRIV_B instead of computing an HMAC on the survey responses using the secret key K1. The buyer 10 provides the generated signature S_B(survey_questionnaire_responses), his Daily_Certificate, PUB_E (Survey1, K2), DataElements={ID_IAP, acct_B, ID_Product, time}, and K2(survey_questionnaire_responses) to the evaluator 50. The evaluator 50 uses the public key certificate of the buyer 10 (called Daily Certificate) to determine the identity of the buyer 10 (acct_B). The buyer's public key PUB_B is also used to validate the received signature S_B(survey_questionnaire_responses). The evaluator 50 then sends the IAP 40 the payment order locator data, consisting of acct_B, ID_Product, and time. This enables the IAP 40 to locate and verify that a payment order was processed on behalf of acct_B, for the stated product, at the stated time. The IAP 40 responds with a yes/no answer, depending on whether the subject payment order exists or does not exist. A possible advantage of the method is that the buyer 10 is not apt to share his private signing key with another party, whereas the buyer 10 may be much less fearful to share a one time password such as Rcode_B.

In another method, the buyer 10 signs the concatenation of the survey questionnaire responses and the original payment order. The buyer 10 provides the generated signature S_B(survey_questionnaire_responses, Payment_Order), Payment_Order, Daily_Certificate containing PUB_B, PUB_E(Survey1, K2), DataElements={ID_IAP}, and K2(survey_questionnaire_responses) to the evaluator 50. The evaluator 50 uses the public key certificate of the buyer 10 (called Daily Certificate) to determine the identity of the buyer 10 (acct_B). The buyer's public key PUB_B is also used to validate the received signature S_B(survey_ questionnaire_responses, Payment_Order). The evaluator 50 then sends the IAP 40 the buyer's Payment_Order. This enables the IAP 40 to locate and verify that a comparable payment order was processed on behalf of acct_B, for the stated product, at the stated time. The IAP 40 responds with a yes/no answer, depending on whether the subject payment order exists or does not exist.

A variation on the above method is where the evaluator 50 sends a hash of the Payment_Order to the IAP 40 instead of the Payment_Order itself, together with sufficient payment order locator information so that the IAP 40 can locate its stored copy of the Payment_Order, hash it, and compare the resulting hash value with the received hash value to determine whether a comparable payment order was processed on behalf of acct_B, for the stated product, at the stated time. The IAP 40 responds with a yes/no answer, depending on whether the subject payment order exists or does not exist.

Yet another variantion on the above method is where the evaluator 50 sends sufficient payment order locator information so that the IAP 40 can locate its stored copy of the Payment_Order. However, in this case, the TAP 40 returns the Payment_Order if such a payment order can be located, or it returns a no response if no such payment order can be located. It is the task of the evaluator 50 to determine whether the Payment_Order returned by the IAP is equal in value to the Payment_Order received from the buyer 10, in which case the survey questionnaire responses are accepted; otherwise the survey questionnaire responses are not accepted.

In yet another method, the buyer 10 saves the Payment_Order, and sends the evaluator 50 a copy of the survey questionnaire responses (possibly encrypted), sufficient payment order locator information, a hash value computed on the Payment_Order, and a signature computed on the survey questionnaire responses and hash value using the buyer's private key PRIV_B. The evaluator 50 sends the payment order locator information to the IAP 40, which is then used to locate the payment order. The IAP 40 returns the payment order or a hash of the payment order to the evaluator 50. which is then used to validate that the hash value received from the buyer 10 does indeed match the hash value computed on the payment order located by the IAP 40. The evaluator 50 also validates the buyer's signature generated on the survey questionnaire responses and the hash value of the payment order, and performs any other needed processing steps.

In yet another method, the IAP 40 posts the hash values of all payment orders in a server database, which is accessible to any evaluator 50, and which has been arranged in some logical fashion to facilitate easy searching (e.g. by date and time and merchant). Entries in the server database consist of the buyer's ID (acct_B) and a hash computed on a payment order. This enables different evaluators to search the database to locate matching hash values in order to verify that payment orders received from a buyer 10 were indeed processed by the seller 20 and forwarded for clearing.

In an alternative embodiment of the invention, the seller 20 provides the buyer 10 with a "proof of purchase" receipt enabling the buyer 10 to later prove that he or she purchased the subject product. The "proof of purchase" receipt would then be the basis for the buyer 10 to prove to the evaluator 50 that he or she purchased the subject product. The "proof of purchase" receipt might also provide additional benefits within a world of electronic commerce. For example, the "proof of purchase" could be used for:

1. Accumulating "loyalty points" or rebates from a vendor or manufacturer

2. Further purchases at a discount (computer software vendors will generally sell an upgrade of a product at less cost if one has purchased a prior version of the product). In this case, the user would get another copy of the full product as long as he had a "proof of purchase" for a prior product. In this case, the vendor doesn't need to keep track of who has purchased the product in his own database. He relies on the "proof of purchase" that each user saves and provides when needed.
3. Promotional offers (i.e., a substitute for a boxtop).
4. Access to some Web pages for free. In other words, you might be allowed access to things that you would not ordinarily have access to.

In the alternative embodiment, steps 72 and 74 in the extended MiniPay system (FIG. 3) are deleted and steps 64, 65, and 68 are modified, as follows:

1. In modified step 64 of the modified MiniPay purchase protocol (FIG. 4), the authentication code (Auth_B) is deleted from NewData in MPay_Order 76. If the evaluator 50 is able to identify the purchased product from the URL in the payment order (alone)—such that the Product_ID is unnecessary—then all of NewData can be deleted from Mpay_Order 76 in modified step 64 of the modified MiniPay purchase protocol (FIG. 4).
2. In modified step 65 of the extended MiniPay system (FIG. 3), the seller 20 additionally sends the buyer 10 a "proof of purchase" receipt, consisting a digital signature generated on the modified Mpay_Order 76 using the seller's private key, PRIV_S, and a certificate containing the seller's public key, PUB_S.
3. In the modified step 68 of the survey protocol (FIG. 5), the following information is transmitted from the buyer 10 to the evaluator 50:
   i. PUB-E(Survey1, K2)
   ii. Buyer's Daily_Certificate 75, containing the public key of the buyer 10 PUB_B.
   iii. Modified Mpay_Order 76, which consists of OldData, modified NewData, and S_B(OldData, modified NewData).
   iv. S_B(survey_questionnaire_responses). S_B( . . . ) is a digital signature generated on the survey questionnaire responses using the buyer's private key PRIV_B.
   v. Seller's Certificate containing PUB_S.
   vi. "proof of purchase" receipt=S_S(modified MPay_Order) received by the buyer 10 in modified step 65.
   vii. K2(survey_questionnaire_responses) 84

The evaluator 50 performs the following validation on the data received in modified step 68 of the modified version of the survey protocol (FIG. 5). After validating the Daily_Certificate 75, the public key PUB_B is used to validate the buyer's signatures S_B(OldData, modified NewData) and S_B(survey_questionnaire_responses) using the received values of OldData, NewData, and the received and decrypted survey questionnaire responses. Encryption of the survey questionnaire responses is optional., and therefore transmission of the encrypted key PUB_E(Survey1, K2) can be omitted if encryption is not performed. After validating the certificate containing PUB_S, the public key PUB_S is used to validate the "proof of purchase" receipt, i.e., to validate the seller's digital signature S_S(modified MPay_Order) using the received value of modified MPay_Order 76. If the three signatures verify correctly, the evaluator 50 knows the following:

1. The received survey questionnaire responses are valid (i.e., unaltered) and the buyer 10 who signed the original payment order is the same buyer 10 who has submitted the survey questionnaire responses. Both signatures, S_B(OldData, modified NewData) and S_B(survey_questionnaire_responses), must be validated in order to draw this conclusion.

2 The entity submitting the survey questionnaire responses did in fact purchase the claimed product. The "proof of purchase" receipt proves that the buyer 10 purchased the claimed product. The seller's signature generated on modified MPay_Order is proof that the claimed modified Mpay_Order 76 was an actual payment order accepted and processed by the seller 20.

A major advantage of the alternative embodiment—based on the "proof of purchase" receipt—is that interaction between the evaluator 50 and IAP 40 is no longer necessary, i.e., no survey reconciliation protocol is required. With the "proof of purchase" receipt, the evaluator 50 can easily determine that a buyer 10 who submits survey questionnaire responses against a claimed product did in fact purchase the claimed product. This can be accomplished without the assistance or participation of the IAP 40. A possible disadvantage of the alternative embodiment is that two extra signature computations are required—one by the seller 20 and another by the buyer 10. It might be possible to eliminate the extra signature computation by the buyer 10. This would be possible if there were an alternative means for the evaluator 50 to validate the identity of the buyer 10. thus to be certain that the party submitting the survey questionnaire responses was in fact the same party who signed the payment order going to the seller 20. If that were possible, then the integrity of the survey questionnaire responses could be assumed using a method in which a secret key K1 is encrypted with PUB_E and sent to the evaluator 50 and where K1 is used to compute an HMAC on the survey questionnaire responses.

Other variations of the present invention will be apparent to those skilled in the art. Thus, while the present invention has been described as an enhancement to the MiniPay system, it is not limited to the MiniPay system and may be used with other electronic payment systems as well. Further, while the invention has been described as using the HTTP transfer protocol and HTML document format, other protocols and formats may be used either alternatively or additionally. Still other variations and modifications of the present invention will be apparent to those skilled in the art.

What is claimed is:

1. In an electronic payment system in which a buyer purchases a product by sending an electronic payment order to a seller, a method of generating survey information on the product, said method being performed by an evaluator distinct from the buyer and the seller and comprising the steps of:

maintaining product survey information based upon responses from buyers that have purchased products from a seller;

receiving a survey response from an entity purporting to be a buyer of a product from the seller, together with transaction information sufficient to identify an alleged purchase transaction;

determining, using the transaction information, whether the entity in fact purchased the product from the seller; and incorporating the response into the product survey information only if it is determined that the entity in fact purchased the product from the seller.

2. The method of claim 1, further comprising the step of:

providing product survey information to a prospective buyer upon request from that buyer.

3. The method of claim 2 in which the product survey information is provided to the prospective buyer in encrypted form.

4. The method of claim 1 in which the survey response is accompanied by an integrity value generated from it by the entity purporting to be a buyer, the method including the further step of:

authenticating the survey response using the integrity value.

5. The method of claim 4 in which the integrity value is a message authentication code.

6. The method of claim 4 in which the integrity value is a digital signature.

7. The method of claim 1 in which the survey response is received in encrypted form, the method including the further step of:

decrypting the survey response to regenerate it in clear form.

8. The method of claim 1 in which a buyer generates an authentication code from a secret value and includes the authentication code in the electronic payment order to the seller, the determining step comprising the steps of:

receiving the authentication code included in the electronic payment order to the seller;

receiving the secret value from which the authentication code was generated;

regenerating an authentication code from the received secret value; and comparing the regenerated authentication code with the received authentication code.

9. In an electronic payment system in which a buyer purchases a product by sending an electronic payment order to a seller, a method of generating survey information on the product, comprising the steps of:

maintaining product survey information based upon responses from buyers that have purchased products from a seller;

receiving a survey response from an entity purporting to be a buyer of a product from the seller, together with an authentication code included in the electronic payment order to the seller and a secret value from which the authentication code was generated;

determining whether the entity in fact purchased the product from the seller by regenerating an authentication code from the received secret value and comparing the regenerated authentication code with the received authentication code; and incorporating the response into the product survey information only if it is determined that the entity in fact purchased the product from the seller.

10. The method of claim 1 in which buyers reconcile purchase transactions with the seller through an intermediary entity.

11. The method of claim 10 in which the evaluator determines whether the entity in fact purchased the product from the seller by communicating with the intermediary entity.

12. In an electronic payment system in which a buyer purchases a product by sending an electronic payment order to a seller and reconciles purchase transactions with the seller through an intermediary entity, a method of generating survey information on the product, said method being performed by an evaluator distinct from the buyer and seller and comprising the steps of:

maintaining product survey information based upon responses from buyers that have purchased products from a seller;

receiving a survey response from a responding entity purporting to be a buyer of a product from the seller;

determining whether the responding entity in fact purchased the product from the seller by communicating with the intermediary entity; and incorporating the response into the product survey information only if it is determined that the responding entity in fact purchased the product from the seller.

13. The method of claim 12 in which the evaluator determines whether the entity in fact purchased the product from the seller by:

providing the intermediary entity with transaction information sufficient to identify an alleged purchase transaction;

receiving from the intermediary entity an indication of whether the alleged purchase transaction was actually made.

14. The method of claim 12 in which the transaction information identifies a product allegedly purchased.

15. The method of claim 12 in which the transaction information identifies a date of an alleged purchase.

16. The method of claim 12 in which the transaction information comprises a copy of a payment order.

17. The method of claim 12 in which the transaction information comprises a hash of a payment order.

18. The method of claim 1 in which the seller provides the buyer with an unforgeable proof of purchase attesting that the buyer purchased a product from the seller, the determining step comprising the steps of:

receiving a proof of purchase from the entity purporting to be a buyer of a product from the seller; and validating the proof of purchase to determine whether the entity purchased the product from the seller.

19. In an electronic payment system in which a buyer purchases a product by sending an electronic payment order to a seller, a method of generating survey information on the product, comprising the steps of:

maintaining product survey information based upon responses from buyers that have purchased products from a seller;

receiving a survey response from an entity purporting to be a buyer of a product from the seller, together with an unforgeable proof of purchase attesting that the entity purchased the product from the seller;

validating the proof of purchase to determine whether the entity purchased the product from the seller; and incorporating the response into the product survey information only if it is determined that the entity in fact purchased the product from the seller.

20. In an electronic payment system in which a buyer purchases a product by sending an electronic payment order to a seller, apparatus for generating survey information on the product, said apparatus being associated with an evaluator distinct from the buyer and the seller and comprising:

means for maintaining product survey information based upon responses from buyers that have purchased products from a seller;

means for receiving a survey response from an entity purporting to be a buyer of a product from the seller, together with transaction information sufficient to identify an alleged purchase transaction;

means for determining, using the transaction information, whether the entity in fact purchased the product from the seller; and means for incorporating the response into the product survey information only if it is determined that the entity in fact purchased the product from the seller.

21. The apparatus of claim 20, further comprising:

means for providing product survey information to a prospective buyer upon request from that buyer.

22. The apparatus of claim 20 in which the survey response is accompanied by an integrity value generated from it by the entity purporting to be a buyer, the apparatus further comprising:

means for authenticating the survey response using the integrity value.

23. The apparatus of claim 20 in which a buyer generates an authentication code from a secret value and includes the authentication code in the electronic payment order to the seller, the determining means comprising:

means for receiving the authentication code included in the electronic payment order to the seller;

means for receiving the secret value from which the authentication code was generated;

means for regenerating an authentication code from the received secret value; and means for comparing the regenerated authentication code with the received authentication code.

24. The apparatus of claim 20 in which the seller provides the buyer with an unforgeable proof of purchase attesting that the buyer purchased a product from the seller, the determining means comprising:

means for receiving a proof of purchase from the entity purporting to be a buyer of a product from the seller; and means for validating the proof of purchase to determine whether the entity purchased the product from the seller.

25. A program storage device readable by a machine, tangibly embodying a program of instructions executable by the machine to perform method steps for generating product survey information in an electronic payment system in which a buyer purchases a product by sending an electronic payment order to a seller, the method steps being performed by an evaluator distinct from the buyer and the seller and comprising:

maintaining product survey information based upon responses from buyers that have purchased products from a seller;

receiving a survey response from an entity purporting to be a buyer of a product from the seller together with transaction information sufficient to identify an alleged purchase transaction;

determining, using the transaction information, whether the entity in fact purchased the product from the seller; and incorporating the response into the product survey information only if it is determined that the entity in fact purchased the product from the seller.

26. The program storage device of claim 25, the method steps further comprising:

providing product survey information to a prospective buyer upon request from that buyer.

27. The program storage device of claim 25 in which the survey response is accompanied by an integrity value generated from it by the entity purporting to be a buyer, the method steps further comprising:

authenticating the survey response using the integrity value.

28. The program storage device of claim 25 in which a buyer generates an authentication code from a secret value and includes the authentication code in the electronic payment order to the seller, the determining step comprising:

receiving the authentication code included in the electronic payment order to the seller;

receiving the secret value from which the authentication code was generated;

regenerating an authentication code from the received secret value; and comparing the regenerated authentication code with the received authentication code.

29. The program storage device of claim 25 in which the seller provides the buyer with an unforgeable proof of purchase attesting that the buyer purchased a product from the seller, the determining step comprising:

receiving a proof of purchase from the entity purporting to be a buyer of a product from the seller; and validating the proof of purchase to determine whether the entity purchased the product from the seller.

30. In an electronic payment system in which a buyer purchases a product by sending an electronic payment order to a seller, a method comprising the steps of:

receiving an electronic payment order from a buyer for the purchase of a product from a seller; and in response to receiving the electronic payment order, providing the buyer with an unforgeable proof of purchase attesting a purchase transaction.

31. The method of claim 30 in which the proof of purchase identifies the buyer.

32. The method of claim 30 in which the proof of purchase identifies the seller.

33. The method of claim 30 in which the proof of purchase identifies the product purchased from the seller.

34. The method of claim 30 in which the unforgeable proof of purchase comprises an integrity value generated on a message attesting a purchase transaction.

35. The method of claim 34 in which the integrity value comprises a digital signature.

36. The method of claim 34 in which the message attesting a purchase transaction comprises the electronic payment order.

37. The method of claim 30 in which the product comprises a service.

38. In an electronic payment system in which a buyer purchases a product by sending an electronic payment order to a seller, apparatus comprising:

means for receiving an electronic payment order from a buyer for the purchase of a product from a seller; and means responsive to receiving the electronic payment order for providing the buyer with an unforgeable proof of purchase attesting a purchase transaction.

39. A program storage device readable by a machine, tangibly embodying a program of instructions executable by the machine to perform method steps in an electronic payment system in which a buyer purchases a product by sending an electronic payment order to a seller, the method steps comprising:

receiving an electronic payment order from a buyer for the purchase of a product from a seller; and in response to receiving the electronic payment order, providing the buyer with an unforgeable proof of purchase attesting a purchase transaction.

40. The method of claim 9 in which the authentication code is generated as a one-way function of the secret value.

41. The method of claim 13 in which the transaction information identifies the entity purporting to be a buyer.

42. The method of claim 19 in which the proof of purchase contains a digital signature of the seller, the validating step comprising the step of verifying the digital signature.

43. In an electronic payment system in which a buyer purchases a product by sending an electronic payment order to a seller, apparatus for generating survey information on the product, comprising:

means for maintaining product survey information based upon responses from buyers that have purchased products from a seller;

means for receiving a survey response from an entity purporting to be a buyer of a product from the seller, together with an authentication code included in the electronic payment order to the seller and a secret value from which the authentication code was generated;

means for determining whether the entity in fact purchased the product -from the seller by regenerating an authentication code from the received secret value and comparing the regenerated authentication code with the received authentication code; and means for incorporating the response into the product survey information only if it is determined that the entity in fact purchased the product from the seller.

44. In an electronic payment system in which a buyer purchases a product by sending an electronic payment order to a seller and reconciles purchase transactions with the seller through an intermediary entity, apparatus for generating survey information on the product, said apparatus being associated with an evaluator distinct from the buyer and seller and comprising:

means for maintaining product survey information based upon responses from buyers that have purchased products from a seller;

means for receiving a survey response from a responding entity purporting to be a buyer of a product from the seller;

means for determining whether the responding entity in fact purchased the product from the seller by communicating with the intermediary entity; and means for incorporating the response into the product survey information only if it is determined that the responding entity in fact purchased the product from the seller.

45. In an electronic payment system in which a buyer purchases a product by sending an electronic payment order to a seller, apparatus for generating survey information on the product, comprising:

means for maintaining product survey information based upon responses from buyers that have purchased products from a seller;

means for receiving a survey response from an entity purporting to be a buyer of a product from the seller, together with an unforgeable proof of purchase attesting that the entity purchased the product from the seller;

means for validating the proof of purchase to determine whether the entity purchased the product from the seller; and means for incorporating the response into the product survey information only if it is determined that the entity in fact purchased the product from the seller.

46. A program storage device readable by a machine, tangibly embodying a program of instructions executable by the machine to perform method steps for generating product survey information in an electronic payment system in which a buyer purchases a product by sending an electronic payment order to a seller, the method steps comprising:

maintaining product survey information based upon responses from buyers that have purchased products from a seller;

receiving a survey response from an entity purporting to be a buyer of a product from the seller, together with an authentication code included in the electronic payment order to the seller and a secret value from which the authentication code was generated;

determining whether the entity in fact purchased the product from the seller by regenerating an authentication code from the received secret value and comparing the regenerated authentication code with the received authentication code; and incorporating the response into the product survey information only if it is determined that the entity in fact purchased the product from the seller.

47. A program storage device readable by a machine, tangibly embodying a program of instructions executable by the machine to perform method steps for generating product survey information in an electronic payment system in which a buyer purchases a product by sending an electronic payment order to a seller and reconciles purchase transactions with the seller through an intermediary entity, the method steps being performed by an evaluator distinct from the buyer and seller and comprising:

maintaining product survey information based upon responses from buyers that have purchased products from a seller;

receiving a survey response from a responding entity purporting to be a buyer of a product from the seller;

determining whether the responding entity in fact purchased the product from the seller by communicating with the intermediary entity; and incorporating the response into the product survey information only if it is determined that the responding entity in fact purchased the product from the seller.

48. A program storage device readable by a machine, tangibly embodying a program of instructions executable by the machine to perform method steps for generating product survey information in an electronic payment system in which a buyer purchases a product by sending an electronic payment order to a seller, the method steps comprising:

maintaining product survey information based upon responses from buyers that have purchased products from a seller;

receiving a survey response from an entity purporting to be a buyer of a product from the seller, together with an unforgeable proof of purchase attesting that the entity purchased the product from the seller;

validating the proof of purchase to determine whether the entity purchased the product from the seller; and incorporating the response into the product survey information only if it is determined that the entity in fact purchased the product from the seller.

* * * * *